US012810451B2

(12) United States Patent
Minchenkov et al.

(10) Patent No.: US 12,810,451 B2
(45) Date of Patent: *Nov. 24, 2026

(54) ARTIFACT IDENTIFICATION AND REMOVAL FROM INTRAORAL SCANS

(71) Applicant: Align Technology, Inc., San Jose, CA (US)

(72) Inventors: Mikhail Minchenkov, Zhukovsky (RU); Pavel Agniashvili, Moscow (RU); Konstantin Kryzhanovskiy, Moscow (RU); Evgeniy Chelishchev, Moscow (RU); Tatiana Kurilova, Moscow (RU)

(73) Assignee: Align Technology, Inc., San Jose, CA (US)

( * ) Notice: Subject to any disclaimer, the term of this patent is extended or adjusted under 35 U.S.C. 154(b) by 374 days.

This patent is subject to a terminal disclaimer.

(21) Appl. No.: 18/420,731

(22) Filed: Jan. 23, 2024

(65) Prior Publication Data

US 2024/0169571 A1 May 23, 2024

Related U.S. Application Data

(63) Continuation of application No. 17/895,002, filed on Aug. 24, 2022, now Pat. No. 11,928,832, which is a (Continued)

(51) Int. Cl.
*G06T 7/55* (2017.01)
*A61C 9/00* (2006.01)
(Continued)

(52) U.S. Cl.
CPC .............. *G06T 7/55* (2017.01); *A61C 9/0053* (2013.01); *A61C 13/0004* (2013.01);
(Continued)

(58) Field of Classification Search
CPC ......... G06T 7/55; G06T 7/0014; G06T 17/20; G06T 2200/08; G06T 2207/30036;
(Continued)

(56) References Cited

U.S. PATENT DOCUMENTS 9,629,551 B2 * 4/2017 Fisker .................... A61C 19/04
RE49,605 E 8/2023 Kopelman
(Continued)

*Primary Examiner* — Christopher M Brandt
(74) *Attorney, Agent, or Firm* — Lowenstein Sandler LLP

(57) ABSTRACT

An intraoral scanning system comprises an intraoral scanner and a computing device. The intraoral scanner generates a intraoral scans of a dental site, the intraoral scans comprising at least a first intraoral scan and a second intraoral scan. The computing device receives the intraoral scans and determines a region of the second intraoral scan comprising a plurality of points that satisfy one or more potential artifact criteria based on a comparison of the second intraoral scan with the first intraoral scan. The computing device identifies the region as an artifact based at least in part on determining that the region satisfies one or more removal criteria. The computing device removes the region from the second intraoral scan responsive to identifying the region as an artifact.

18 Claims, 17 Drawing Sheets

Related U.S. Application Data continuation of application No. 16/837,960, filed on Apr. 1, 2020, now Pat. No. 11,455,727.

(60) Provisional application No. 62/842,424, filed on May 2, 2019.

(51) Int. Cl.

| | |
|---|---|
| ***A61C 13/00*** | (2006.01) |
| ***G06T 7/00*** | (2017.01) |
| ***G06T 17/20*** | (2006.01) |

(52) U.S. Cl.
CPC ............ *G06T 7/0014* (2013.01); *G06T 17/20* (2013.01); *G06T 2200/08* (2013.01); *G06T 2207/30036* (2013.01)

(58) Field of Classification Search
CPC ... G06T 2210/41; G06T 17/00; A61C 9/0053; A61C 13/0004; G06V 2201/03
See application file for complete search history.

(56) References Cited

U.S. PATENT DOCUMENTS

| | | | | |
|---|---|---|---|---|
| 2005/0018901 | A1* | 1/2005 | Kaufmann | G06T 17/20 382/154 |
| 2008/0130825 | A1* | 6/2008 | Fu | G06T 7/248 378/8 |
| 2011/0255765 | A1* | 10/2011 | Carlson | A61B 6/032 378/4 |
| 2012/0015316 | A1* | 1/2012 | Sachdeva | A61C 7/002 382/128 |
| 2012/0100500 | A1* | 4/2012 | Gao | B33Y 80/00 703/11 |
| 2012/0242789 | A1* | 9/2012 | Cheng | H04N 13/15 348/43 |
| 2015/0320320 | A1* | 11/2015 | Kopelman | A61B 5/0088 433/215 |
| 2016/0220212 | A1* | 8/2016 | Duewer | A61B 6/5258 |
| 2018/0005371 | A1* | 1/2018 | Sabina | A61C 7/002 |
| 2018/0025496 | A1* | 1/2018 | Lindner | G06T 17/00 382/154 |
| 2019/0175131 | A1* | 6/2019 | Duewer | A61B 6/5205 |
| 2019/0298280 | A1* | 10/2019 | Takada | A61B 6/52 |

* cited by examiner

ARTIFACT IDENTIFICATION AND REMOVAL FROM INTRAORAL SCANS

RELATED APPLICATIONS

This patent application is a continuation of U.S. patent application Ser. No. 17/895,002, filed Aug. 24, 2022, which is a continuation of U.S. patent application Ser. No. 16/837,960, filed Apr. 1, 2020, which claims the benefit under 35 U.S.C. § 119(e) of U.S. Provisional Application No. 62/842,424, filed May 2, 2019, all of which are herein incorporated by reference.

TECHNICAL FIELD

Embodiments of the present disclosure relate to the field of dentistry and, in particular, to systems and methods to identify and/or remove excess material (also referred to as artifacts) from intraoral scans.

BACKGROUND

For both orthodontic and restorative dental work, one or more intraoral scans may be generated of a patient's dental arch using an intraoral scanner. These intraoral scans are then used to generate a virtual three-dimensional (3D) model of the dental arch. The intraoral scans may include information about teeth and gums, and may further include information about other objects that are not material to the orthodontic or restorative dental work, referred to herein as excess material. Inclusion of the excess material in the intraoral scans, and ultimately in the 3D model of the dental arch generated from the 3D scans, can be problematic. The excess material often occludes clinically significant regions, such as teeth and gums, and can degrade a quality of the virtual 3D model.

Once the virtual 3D model is generated, it is generally sent to a lab for processing. Typically, a lab technician then manually removes the excess material from the virtual 3D model (or from a physical 3D model generated from the virtual 3D model). This process is often referred to as modeling, and often includes resculpting the virtual 3D model or physical 3D model. The process of manually modifying the virtual 3D model or physical 3D model is a time intensive task that is performed by experienced lab technicians, which increases the overall cost of the dental prosthetic or orthodontia and increases the amount of time that it takes to manufacture the dental prosthetic or orthodontia.

SUMMARY

In one example embodiment, a method includes receiving a plurality of intraoral scans of a dental site, the plurality of intraoral scans comprising at least a first intraoral scan and a second intraoral scan. The method further includes determining the following for each point in the second intraoral scan based on a first comparison of the first intraoral scan to the second intraoral scan: whether a surface normal at the point is co-directional with a viewing direction associated with the first intraoral scan, wherein points in the second intraoral scan that have a surface normal that is co-directional with the first viewing direction are back-face points; and whether the point is a back-face point that is behind a corresponding point in the first intraoral scan when viewed from a first viewing direction associated with the first intraoral scan, wherein points in the second intraoral scan that are not behind corresponding points in the first intraoral scan are uncovered points. The method further includes determining a region comprising a plurality of points in the second intraoral scan that are both back-face points and uncovered points, determining whether the region satisfies one or more removal criteria, and removing the region from the second intraoral scan responsive to determining that the region satisfies the one or more removal criteria.

In one embodiment, a method includes receiving a plurality of intraoral scans of a dental site. The method further includes making a plurality of comparisons for a first intraoral scan of the plurality of intraoral scans, wherein each comparison is with an additional intraoral scan of the plurality of intraoral scans, wherein each comparison of the first intraoral scan to an additional intraoral scan comprises. The method further includes making, for each point in the first intraoral scan, a first determination as to whether the point is behind a corresponding point in the additional intraoral scan. The method further includes making, for each point in the first intraoral scan, a second determination as to whether a surface normal at the point is co-directional with a viewing direction associated with the additional intraoral scan. The method further includes labeling each point based on at least one of the first determination or the second determination. The method further includes aggregating labels from the plurality of comparisons. The method further includes determining, based on the labels aggregated from the plurality of comparisons, a plurality of points that satisfy one or more first criteria. The method further includes determining a region comprising the plurality of points that satisfy the one or more criteria, determining whether the region satisfies one or more removal criteria, and removing the region from the first intraoral scan responsive to determining that the region satisfies the one or more removal criteria.

Other embodiments include systems and computing devices that include a processor and a memory. The memory may store instructions for executing one or more of the above described methods, and the processor may execute the instructions from the memory to perform the one or more above described methods. In other embodiments, computer readable storage media include instructions that, when executed by a processing device (e.g., a processor), cause the processing device to perform operations from one or more of the above descried methods.

BRIEF DESCRIPTION OF THE DRAWINGS

Embodiments of the present disclosure are illustrated by way of example, and not by way of limitation, in the figures of the accompanying drawings.

DETAILED DESCRIPTION

Figure 1:
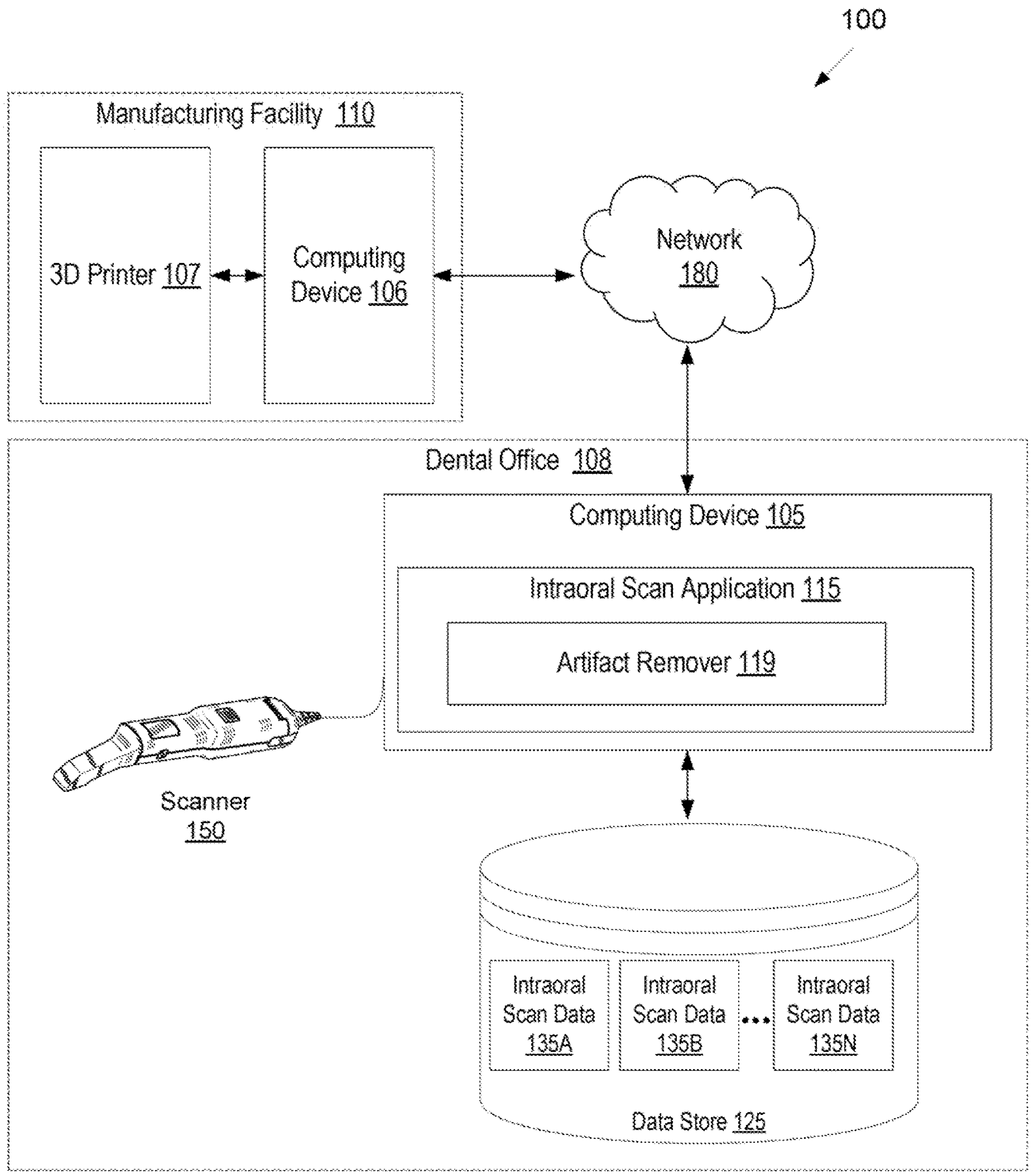
FIG. 1 illustrates one embodiment of a system for performing intraoral scanning and/or generating a virtual three-dimensional model of an intraoral site.

Provided are method and apparatus for detection and removal of a variety of artifacts (also referred to as excess material and flaps) that occur during intraoral scanning (i.e. intraoral 3D scanning). Such artifacts often occur as a result of soft tissues (e.g., cheek, tongue, etc.) touching a patient's teeth during intraoral scanning. Excess material (also referred to as artifacts) includes various artifacts (tongue, lips, tools and others) that occur during scanning and that may impede further processing. In some embodiments, excess material includes material other than gums or teeth. Embodiments remove artifacts without inadvertently removing image data representing teeth. Embodiments function to accurately remove artifacts from intraoral scans and/or virtual 3D models without removing portions of teeth from the intraoral scans or virtual 3D models in a manner that is independent of orientation of the scan. Altogether, the techniques described allow a system to significantly improve scanning quality of a dental site and user experience of a user of an intraoral scanner. Additionally, embodiments may reduce the cost of dental prosthetics or orthodontia manufactured based on intraoral scans by increasing the accuracy and quality of those scans, and by reducing an amount of cleanup and/or rework that is performed on 3D models generated from the scans.

In embodiments, some or all of the techniques described herein are performed on intraoral images in real-time or near real time during an intraoral scanning session. Accordingly, an intraoral scan may be generated, and the intraoral scan may subsequently be processed to identify and/or remove artifacts while subsequent scans are being generated. Additionally, or alternatively, the techniques described herein may be performed after intraoral scanning is complete (e.g., as a step in generation of a 3D model of a dental arch).

Intraoral scanners work by moving a wand (intraoral scanner) inside a patient's mouth to capture all viewpoints of every tooth (or a subset of teeth that are of interest). During scanning, the wand calculates distances to solid surfaces. These distances may be recorded as scans or images that includes 'height maps'. Each height map is overlapped algorithmically, or 'stitched', with the previous set of height maps to generate a growing 3D model. Two-dimensional (2D) color images may also be generated by the intraoral scanner (referred to as viewfinder images). After scanning, the final virtual 3D model is a set of 3D points and their connections with each other (i.e. a mesh).

In one embodiment, a method of detection of such artifacts is based on analysis of mutual position of elementary frames (i.e., intraoral scans) obtained from an intraoral scanner, detection of regions (also referred to as fragments) corresponding to artifacts (excess material), and their further removal. The intraoral scans are used to generate a virtual 3D model of a dental site (e.g., a full dental arch or a portion thereof). The detection and removal of artifacts from the intraoral scans used to generate the virtual 3D model improves the quality of the obtained virtual 3D model. This may reduce the number of virtual 3D models that undergo additional manual processing.

Various embodiments are described herein. It should be understood that these various embodiments may be implemented as stand-alone solutions and/or may be combined. Accordingly, references to an embodiment, or one embodiment, may refer to the same embodiment and/or to different embodiments.

FIG. 1 illustrates one embodiment of a system 100 for performing intraoral scanning and/or generating a virtual three-dimensional model of an intraoral site. In one embodiment, one or more components of system 100 carries out one or more operations described below with reference to FIGS. 2-14B.

System 100 includes a dental office 108 and a manufacturing facility 110. The dental office 108 and the manufacturing facility 110 each include a computing device 105, 106, where the computing devices 105, 106 may be connected to one another via a network 180. The network 180 may be a local area network (LAN), a public wide area network (WAN) (e.g., the Internet), a private WAN (e.g., an intranet), or a combination thereof.

Computing device 105 may be coupled to an intraoral scanner 150 (also referred to as a scanner) and/or a data store 125. Computing device 106 may also be connected to a data store (not shown) and to a 3D printer 107. The data stores may be local data stores and/or remote data stores. Computing device 105 and computing device 106 may each include one or more processing devices, memory, secondary storage, one or more input devices (e.g., such as a keyboard, mouse, tablet, and so on), one or more output devices (e.g., a display, a printer, etc.), and/or other hardware components.

Intraoral scanner 150 may include a probe (e.g., a hand held probe) for optically capturing three-dimensional structures. The intraoral scanner 150 may be used to perform intraoral scanning of a patient's oral cavity. An intraoral scan application 115 running on computing device 105 may communicate with the scanner 150 to effectuate the intraoral scanning. A result of the intraoral scanning may be intraoral scan data 135A, 135B through 135N that may include one or more sets of intraoral images or scans. Each intraoral scan may be a two-dimensional (2D) or 3D image that includes a height map of a portion of a dental site, and may include x, y and z information. Alternatively, the intraoral scans may not include height maps. In one embodiment, the intraoral scanner 150 generates numerous discrete (i.e., individual) intraoral scans. Sets of discrete intraoral scans may be merged into a smaller set of blended intraoral scans, where each blended scan is a combination of multiple discrete scans. The scanner 150 may transmit the intraoral scan data 135A, 135B through 135N to the computing device 105. Computing device 105 may store the intraoral scan data 135A-135N in data store 125.

According to an example, a user (e.g., a practitioner) may subject a patient to intraoral scanning. In doing so, the user may apply scanner 150 to one or more patient intraoral locations. The scanning may be divided into one or more segments. As an example, the segments may include a lower buccal region of the patient, a lower lingual region of the patient, a upper buccal region of the patient, an upper lingual region of the patient, one or more preparation teeth of the patient (e.g., teeth of the patient to which a dental device such as a crown or other dental prosthetic will be applied), one or more teeth which are contacts of preparation teeth (e.g., teeth not themselves subject to a dental device but which are located next to one or more such teeth or which interface with one or more such teeth upon mouth closure), and/or patient bite (e.g., scanning performed with closure of the patient's mouth with the scan being directed towards an interface area of the patient's upper and lower teeth). Via such scanner application, the scanner 150 may provide intraoral scan data 135A-N to computing device 105. The intraoral scan data 135A-N may be provided in the form raw scans or blended scans, each of which may be referred to as intraoral scans or as intraoral images. The intraoral scans each comprise a height map that indicates a depth for each pixel in one embodiment.

When a scan session is complete (e.g., all images for an intraoral site or dental site have been captured), intraoral scan application 115 may generate a virtual 3D model of one or more scanned dental sites. To generate the virtual 3D model, intraoral scan application 115 may register (i.e., "stitch" together) the intraoral scans generated from the intraoral scan session. In one embodiment, performing image registration includes capturing 3D data of various points of a surface in multiple scans, and registering the scans by computing transformations between the scans. The 3D data may be in the form of multiple height maps, which may be projected into a 3D space (referred to as model space or 3D model space) of a 3D model to form a portion of the 3D model. The scans may be integrated into a common reference frame by applying appropriate transformations to points of each registered scan and projecting each scan into the 3D model space.

In one embodiment, registration is performed for adjacent or overlapping intraoral scans (e.g., each successive frame of an intraoral video). In one embodiment, registration is performed using blended images. Registration algorithms are carried out to register adjacent intraoral scans (e.g., two adjacent blended intraoral scans) and/or to register an intraoral scan with a 3D model, which essentially involves determination of the transformations which align one scan with the other scan and/or with the 3D model. Registration may involve identifying multiple points in each scan (e.g., point clouds) of a scan pair (or of a scan and the 3D model), surface fitting to the points, and using local searches around points to match points of the two scans (or of the scan and the 3D model). For example, intraoral scan application 115 may match points of one scan with the closest points interpolated on the surface of another scan, and iteratively minimize the distance between matched points. Other registration techniques may also be used.

Intraoral scan application 115 may repeat registration for all scans of a sequence of intraoral scans to obtain transformations for each scan, to register each scan with the previous one and/or with a common reference frame (e.g., with the 3D model). Intraoral scan application 115 integrates all scans into a single virtual 3D model by applying the appropriate determined transformations to each of the scans. Each transformation may include rotations about one to three axes and translations within one to three planes.

Intraoral scan application 115 may generate a 3D model from intraoral scans, and may display the 3D model to a user (e.g., a doctor) via a user interface. The 3D model can then be checked visually by the doctor. The doctor can virtually manipulate the 3D model via the user interface with respect to up to six degrees of freedom (i.e., translated and/or rotated with respect to one or more of three mutually orthogonal axes) using suitable user controls (hardware and/or virtual) to enable viewing of the 3D model from any desired direction. The doctor may review (e.g., visually inspect) the generated 3D model of an intraoral site and determine whether the 3D model is acceptable (e.g., whether a margin line of a preparation tooth is accurately represented in the 3D model and/or whether the 3D model includes artifacts).

Intraoral scan application 115 may include logic (e.g., artifact remover 119) for automatically identifying and removing artifacts from intraoral scans before, during and/or after a virtual 3D model has been generated from the intraoral scans. Such logic may perform the operations of the methods and techniques described below with reference to FIGS. 2-14B.

Artifact remover 119 compares intraoral scans to one another to identify artifacts. For each comparison, one intraoral scan may be set as a source scan, and the other intraoral scan may be set as the test scan to be compared to the source scan and potentially labeled and/or modified based on the comparison. In one embodiment, artifact remover 119 identifies artifacts based on the assumption that the regions of the scans corresponding to artifacts are back-face when viewed along the capture direction of other scans of the model, and at the same time, are not covered by the surfaces of other scans. In addition, an assumption may be made that the artifacts are separated from the tooth surface by a continuous proximity area in which the points of the artifact surface are within a given neighborhood from the points of the tooth surface of another scan.

In one embodiment, the artifact remover 119 classifies scan points, labels regions as connected components of the classified points, calculates features of regions, and detects those regions that correspond to artifacts, based on the analysis of feature values. The artifact remover 119 described in embodiments allows effective removal of a specific type of 3D scanning artifacts that are not removed by other soft tissue removal algorithms, resulting in a reduced number of models that require additional manual processing.

As discussed above, during dental 3D scanning there are artifacts caused by touching of the patient's teeth with soft tissues. One of the varieties of such artifacts is small regions of the soft tissue surfaces attached to the upper part of the teeth. A characteristic feature of these artifacts is an "open" back side, i.e. the artifact is not a closed geometric body, but a one-sided surface. Artifacts of this kind may be referred to as "flaps" herein.

The operating principle of the artifact detection algorithm applied by the artifact remover 119 in embodiments is based on the following assumptions:

a) Scans of the "valid" surface of the dental site are always either facing the scanner image sensor or covered by other scans that are closer to the image sensor;
b) If any part of the scan is back face to the image sensor and is not covered by another scan, it is an artifact (e.g., a flap).

When scanning real objects, holes sometimes appear in the scans. In order to exclude false positives of the flap detection approach on the areas of scans "visible" through such holes, the following assumption is also made in some embodiments:

a) The flap is separated from the tooth surface by a continuous "proximity area" in which the surface of the back face region of the analyzed scan is sufficiently close to the surface of the overlapping scan.

Based on these assumptions, a generalized artifact removal process may include first calculating, for each intraoral scan, features characterizing the position of the intraoral scan in model space. From a set of model scans, pairs of scans may be selected for comparison based on mutual scan positions. Intraoral scans having overlapping bounding boxes may be selected for comparison. For example, intraoral scans that have a bounding box intersecting with a bounding box of another one of the intraoral scans may be selected for comparison with that other intraoral scan. In other embodiments, different types of bounding volumes may be used for scan pair selection, or scans that overlap when viewed from a particular view direction associated with one of the intraoral scans may be selected for comparison, for example. For each selected pair of scans, one of which is a scan being analyzed (referred to as a test scan) and the other scan is overlapping (referred to as a source scan), each point in the analyzed test scan is analyzed and labeled. A point in the test scan may be labeled as a front-face point if the normal direction to the surface of the test scan at the point is opposite to the viewing direction of source scan. A point may be labeled as a proximity area point if the points of the scan surface of the source scan are present in the given neighborhood of the point of the test scan. The point of the test scan may be labeled as a back-face and covered point if the direction of the normal to the surface of the test scan at the point is co-directional to the viewing direction of the source scan and the surface of the source scan is in front of the point of the test scan. The point of the test scan may be labeled as a back-face and non-covered point if the direction of the normal to the surface of the test scan at the point is co-directional to the viewing direction of the source scan and the surface of the source scan is behind the point of the test scan.

For each scan, the artifact remover 119 may combine the labels obtained by pairwise comparison into a unified label set. From the obtained unified label set, the artifact remover 119 may extract connected regions corresponding to potential artifacts (e.g., flaps), consisting of back-face non-covered points and a sub-set of proximity area of points. The artifact remover 119 may then calculate features of extracted connected regions, each of which may or may not represent an artifact (e.g., a flap). Based on the analysis of the feature values, artifact remover 119 may detect regions that represent flaps or other artifacts. Artifact remover 119 may then remove the detected artifacts from intraoral scans. Accordingly, during scanning artifacts (e.g., flaps) may initially occur and then be automatically removed by the artifact remover 119.

Figure 2:
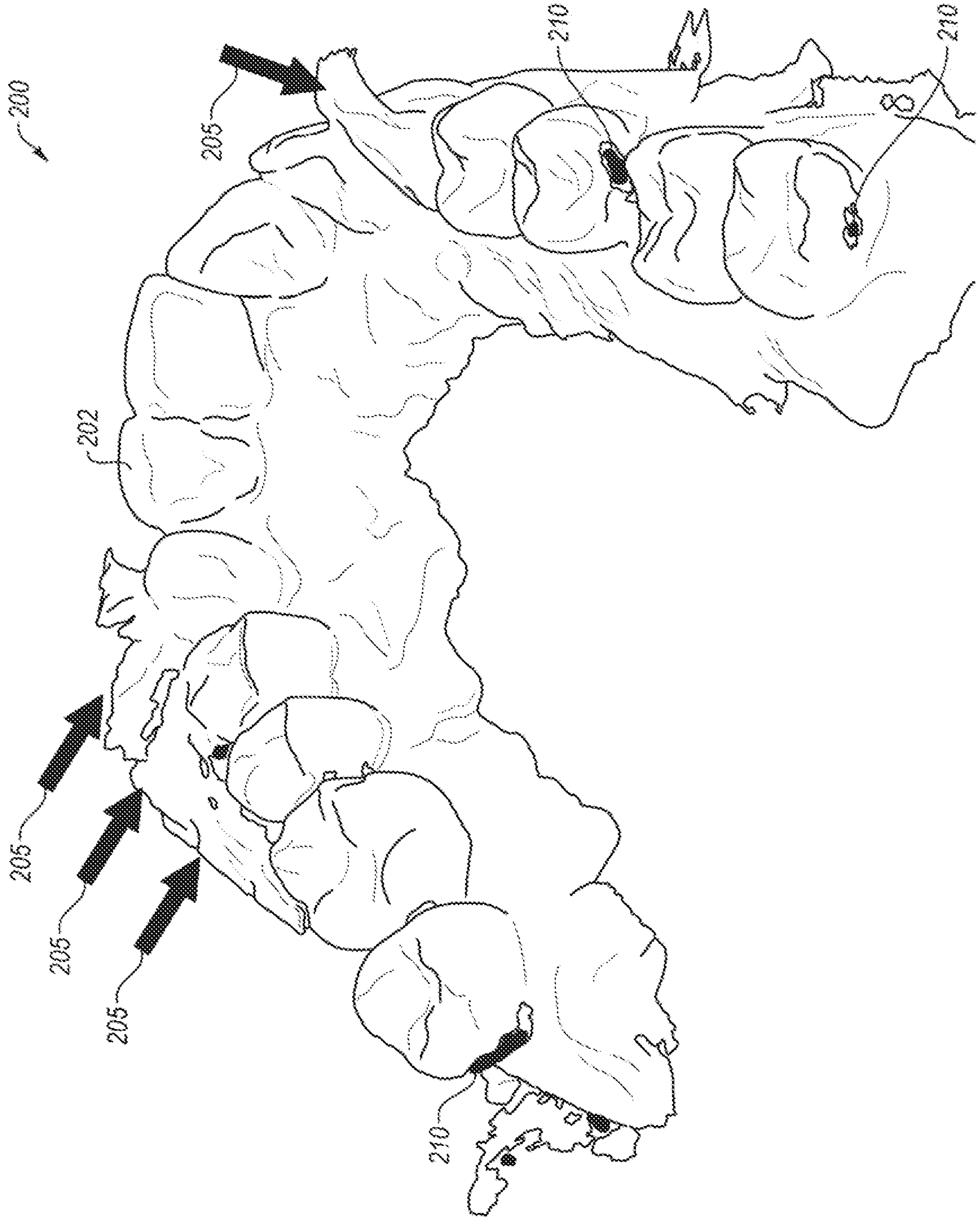
FIG. 2 illustrates an example virtual 3D model of a dental arch with excess material.

FIG. 2 illustrates an example virtual 3D model 200 of a dental arch 202 with flaps 205. The virtual 3D model 200 is generated by stitching together a plurality of intraoral scans. As shown, the virtual 3D model 200 includes voids 210 at areas where insufficient data was collected. Further scanning may be performed to capture additional intraoral scans depicting these areas. As discussed above the inclusion of the flaps 205 in the virtual 3D model can reduce a quality and/or accuracy of the virtual 3D model 200. Accordingly, in traditional systems a user often manually identifies and removes the flaps from the virtual 3D model. However, in embodiments by automatically detecting and removing the flaps without user input and before a virtual 3D model is generated, the accuracy and the quality of the 3D model can be improved, and the amount of time that a user spends on correcting a virtual 3D model of a dental site may be reduced and/or eliminated. Thus, the ultimate cost of manufacturing oral appliances (e.g., polymeric aligners) using the virtual 3D model can be reduced.

FIGS. 3-14B illustrate methods related to intraoral scanning and generation and manipulation of virtual 3D models of dental sites. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing an intraoral scan application 115 and/or an artifact remover 119, such as shown in FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 3:
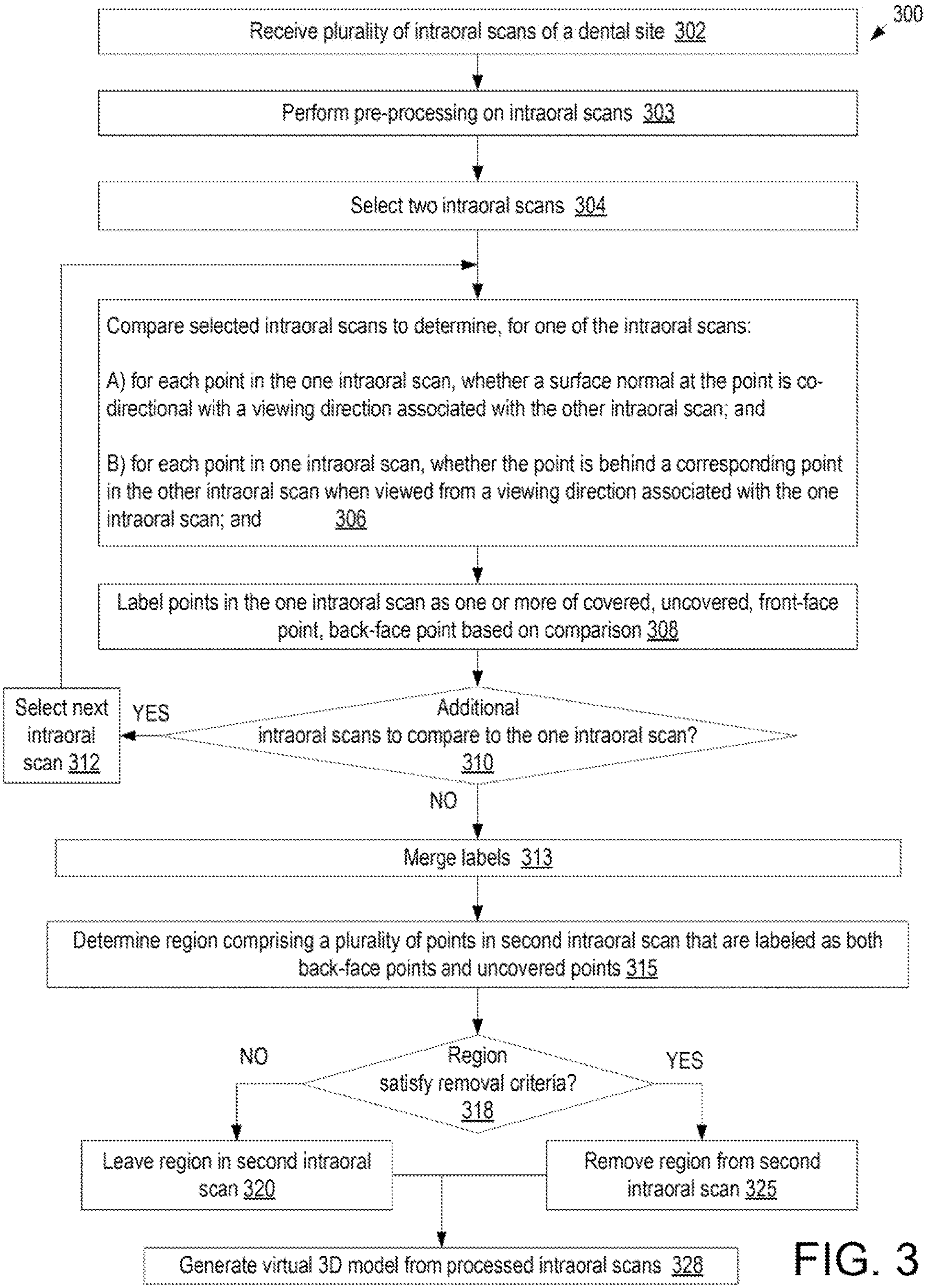
FIG. 3 illustrates a flow diagram for a method of removing excess material from intraoral scans, in accordance with embodiments of the present disclosure.

FIG. 3 illustrates a flow diagram for a method 300 of removing excess material (e.g., flaps) from intraoral scans, in accordance with embodiments of the present disclosure. At block 302, processing logic receives a plurality of intraoral scans of a dental site (e.g., of a dental arch or of a portion of a dental arch). At block 303, processing logic performs pre-processing on each of the intraoral scans. Pre-processing may place the intraoral scans in a better form for comparison with other intraoral scans. Examples of pre-processing include determining an average surface normal for a surface depicted in an intraoral scan and performing extrapolation (e.g., in-painting) to clean up and/or remove small voids in the intraoral scan. Pre-processing is discussed in greater detail with reference to FIGS. 4-6.

At block 304, processing logic selects two intraoral scans for comparison. To select the two intraoral scans, processing logic may calculate, for each intraoral scan, features characterizing the position of the intraoral scan in a model space, where the model space is a three dimensional space in which intraoral scans may be registered. The positions of the intraoral scans may then be compared to one another to identify intraoral scans with overlapping positions in the model space. Scans with intersecting bounding boxes may be selected for comparison. In other embodiments, different types of bounding volumes or areas may be used for scan pair selection, or scans that overlap in the model space when viewed from a particular view direction associated with one of the intraoral scans may be selected for comparison, for example. One selected scan may be designated as a test scan and the other selected scan may be designated as a source scan. The test scan is the scan that will be labeled and/or modified.

At block 306, processing logic compares the selected intraoral scans. Each point in the test scan may be compared against a corresponding point in the source scan. In an example, a corresponding point in the source scan may be a point that has a same x,y position in the model space as a point being compared from the test scan. A plane associated with one of the scans (e.g., the source scan) may be determined, and the position of each point of the test scan may be projected into the model space and then re-projected back onto the plane associated with the source scan. An x,y position of a point in the test scan on the plane may then be determined, and may be compared with the point in the source scan that has the same x,y position on the plane.

For each point in the test scan, processing logic may compute a surface normal of the point. Processing logic may then determine whether a surface normal at the point is co-directional with a viewing direction associated with the source scan. This may be determined by calculating a dot product of the surface normal (a vector) with a vector representing the viewing direction of the source scan in some embodiments. The vector representing the viewing direction of the source scan may be an average surface normal computed for the source scan. If the result of the dot product is a negative value, then this indicates that the point is a back-face point. If the result of the dot product is a positive value, then this indicates that the point is a front-face point.

Additionally, for each back-face point in the test scan, processing logic determines whether the point is behind a corresponding point in the source scan when viewed from the viewing direction associated with the source scan. Based on the determination, processing logic may identify a point (i.e., pixel) in the test scan as a covered point if it is behind the source scan (e.g., has a height value that is lower than a height value of the test scan at the point). Processing logic may identify a point in the test scan as an uncovered point if it is not behind the source scan (e.g., if it has a height that is greater than the height of a corresponding point on the source scan or if the source scan does not depict a surface at the point).

Other determinations may also be made to identify other types of points, as described below with reference to FIGS. 7-9B.

At block 308, processing logic labels the points in the test scan based on a result of the comparison and determinations made at block 306. In one embodiment, points are labeled as front-face or back-face and as covered or uncovered. Accordingly, a point may be a front-face point, a covered back-face point or an uncovered back-face point. Other types of labels may additionally or alternatively be applied to points as discussed with reference to FIGS. 7-9B.

At block 310, processing logic determines whether any additional intraoral scans that can be compared to the test scan have not yet been compared to the test scan. An additional intraoral scan may be comparable to the test scan if their bounding boxes intersect. In other embodiments, different types of bounding volumes or areas may be used to select an intraoral scan for comparison, or an additional intraoral scan may be comparable to the test scan if they overlap in the model space when viewed from a viewing direction of the additional intraoral scan. If there are additional intraoral scans to be compared to the test scan, the method continues to block 312. If all intraoral scans that can be compared to the test scan have been compared to the test scan, the method proceeds to block 313.

At block 312, processing logic selects a next intraoral scan to compare with the test scan. The next intraoral scan may be designated as a new source scan, and a new comparison may be performed between the test scan and the new source scan at block 306. This may result in additional labels being assigned to one or more points in the test scan.

At block 313, processing logic merges labels for the test scan from the multiple comparisons. After the merging, a single point in the test scan may be assigned multiple labels, where each of the labels may be based on a comparison with a different source scan. In one embodiment, the different types of points are ranked based on priority ratings. Each type of label may be associated with a different priority rating. For example, covered back-face labels may have a highest priority rating. Uncovered back-face labels may have a higher priority rating than front-face labels, and covered-back-face labels may have a higher priority rating than uncovered-back-face labels. In one embodiment, the labeling of each point (i.e. pixel) is updated so that the label for that point is the label associated with that point that had the highest priority rating. Accordingly, if a point has a front-face label from comparison with a first source scan, an uncovered back-face label from a comparison with a second source scan, and a covered back-face label from a comparison with a third source scan, then that point would be updated so that it has a single label of covered back-face.

At block 315, processing logic determines one or more region (also referred to as a fragment) in the test scan that is a potential artifact (e.g., a flap). Each region may then be classified. Examples of region classifications include proximity region, potential artifact region, and so on. A proximity region may be a region in a scan that is within a threshold distance from a surface in another scan to which it was compared. Points in a region may share one or more labels. For example, points in a potential artifact region may all be uncovered back-face points. Points in a proximity region may all be proximity points.

A region may be identified as being a potential artifact by finding connected points that are back-face and uncovered. Once a back-face uncovered point is identified, that point may be marked as being part of a region that is a potential artifact. The surrounding points may be checked, and those that are also back-face uncovered points may be added to the region. The surrounding points of those new points in the region may also be checked to determine if they are also back-face uncovered points. This process may proceed until all connected points are found that are back-face and uncovered. In some embodiments, points with other types of labels may also be included in the region, as discussed below with reference to FIGS. 8-9B. Additionally, a similar process may be used to determine other types of regions containing of types of points. This process may be performed to identify multiple regions in the intraoral scan.

At block 318, processing logic determines whether the region (e.g., fragment) satisfies one or more removal criteria, which are discussed in greater detail below with reference to FIG. 12. If the region satisfies the removal criteria, the method proceeds to block 325. If the region fails to satisfy the removal criteria, the method proceeds to block 320.

At block 320, the region is labeled as not being an artifact (e.g., a flap). The region is thus labeled to show that it has been processed. The region is not removed from the test scan.

At block 325, the region is labeled as an artifact or excess material (e.g., as a flap). The region may then automatically be removed from the test scan.

The operations of blocks 315 to 325 may be repeated for multiple different regions in an intraoral scan. For example, a single intraoral scan may include multiple different regions that are each a potential artifact. Each of these regions may be identified, and then processed to determine whether or not they represent artifacts.

At block 328, processing logic may then generate a virtual 3D model by stitching together processed intraoral images (e.g., intraoral scans that have been processed according to the operations of blocks 302-325). Accordingly, the virtual 3D model may lack artifacts (e.g., flaps) or may have a significantly reduced number of artifacts.

Method 300 may be performed for each intraoral scan associated with a particular patient's dental arch that is generated during an intraoral scanning session. In one embodiment, two comparisons are performed for each pair of intraoral scans. A first comparison may designate a first scan of the pair as a source scan and a second scan of the pair as a test scan. This comparison may be performed to determine labels for the second scan. A second comparison may also be performed, where the second comparison designates the first scan as the test scan and the second scan as the source scan. This comparison may be performed to determine labels for the first scan. Each comparison of a pair of scans may result in a set of labels for an intraoral scan.

Artifacts in each intraoral scan may be detected and removed in real-time or near real-time as intraoral scanning is performed. As new intraoral scans are received, those new intraoral scans may be compared against already received intraoral scans to identify and/or remove artifacts from the newly received intraoral scans and/or the previously received intraoral scans. In some embodiments, each intraoral scan is compared to at most a threshold number of relevant other intraoral scans during intraoral scanning. The scans that are selected for comparison to a particular scan may be the most recently received scans. This may reduce a processing time associated with such comparisons. Additionally, the method 300 may be performed after all intraoral scans have been received and/or before a virtual 3D model of a dental arch is generated. At this time, each intraoral scan may be compared against each overlapping other intraoral scan (i.e. against each other relevant intraoral scan). The increased comparisons performed after intraoral scanning is complete may take additional processing resources and additional time than the lesser number of comparisons performed during intraoral scanning, but may result in higher accuracy. In some embodiments, method 300 is performed during scanning and again as a step in model generation. Accordingly, some artifacts may be identified and/or removed during scanning and additional artifacts may be identified and/or removed during 3D model generation.

Figure 4:
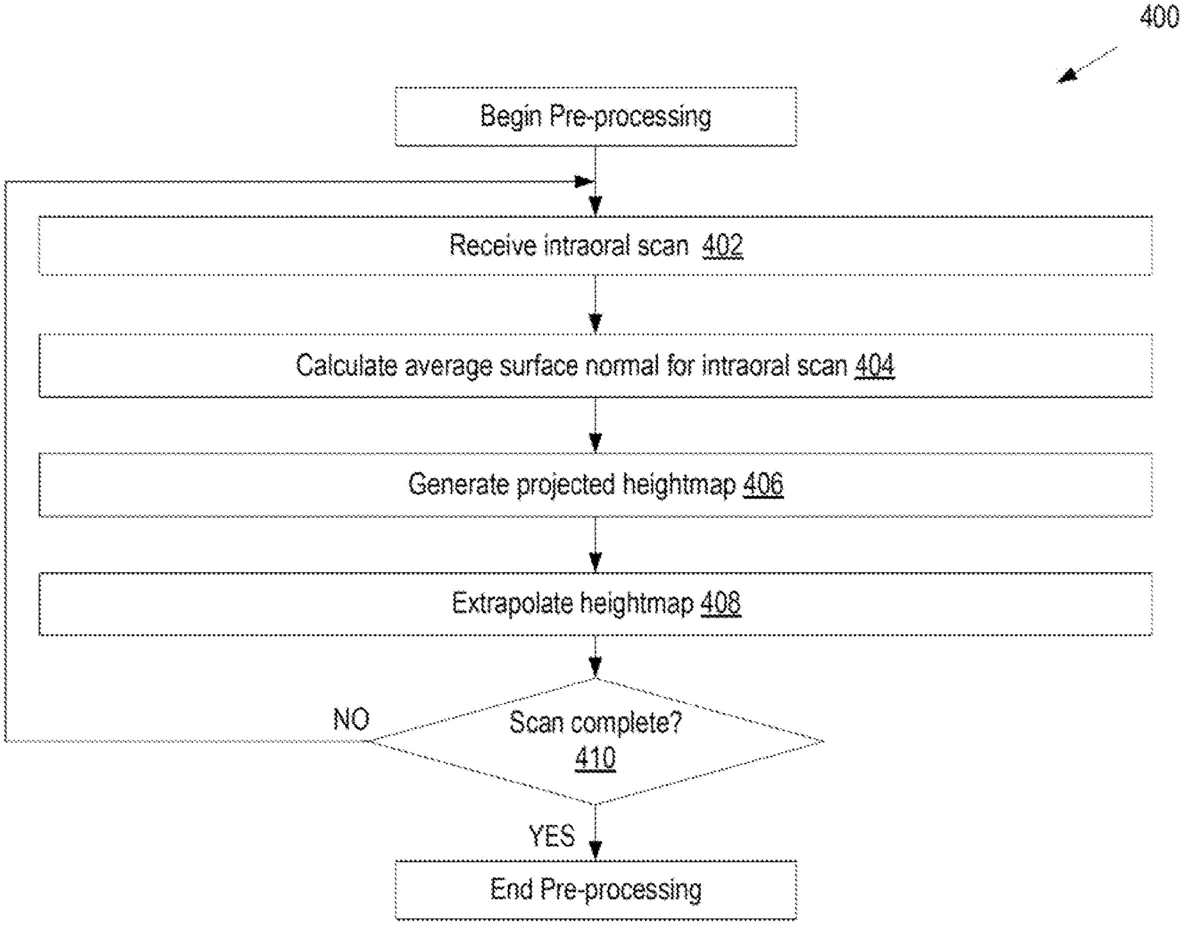
FIG. 4 illustrates a flow diagram for a method of preprocessing intraoral scans before determining whether the intraoral scans include excess material, in accordance with embodiments of the present disclosure.

FIG. 4 illustrates a flow diagram for a method 400 of pre-processing intraoral scans before determining whether the intraoral scans include excess material, in accordance with embodiments of the present disclosure. Method 400 may be performed, for example, at block 303 of method 300 and/or at block 335 of method 328.

At block 402 of method 400, processing logic receives an intraoral scan. The received intraoral scan was generated from an original viewing direction by a scanner positioned at the original viewing direction. The intraoral scan is on a plane that is orthogonal to the original viewing direction (e.g., to a vector parallel to the original viewing direction). The original scan includes a height map with a height value for each pixel in the intraoral scan.

At block 404, processing logic calculates an average surface normal for the intraoral scan. The surface normal at a point is a vector that is perpendicular to the tangent plane of the surface at the point. The surface normal for the intraoral scan is the average surface normal of all points on a surface depicted in the intraoral scan. To calculate the surface normal for the intraoral scan, surface normals are computed for each point on the surface depicted in the intraoral scan. An average of the surface normals of all of the points is then computed.

At block 406, a projected height map of the intraoral scan may be generated. The projected height map is generated by projecting the surface depicted in the intraoral scan into 3D model space, and then re-projecting the surface from the 3D model space back onto a new plane that is orthogonal to the average surface normal for the intraoral scan. For example, the projected height map may be generated by rasterizing the scan data of the intraoral scan along the average surface normal for the intraoral scan. A point of a 3D surface in the 3D model space may correspond to a pixel in the original intraoral scan and to a pixel in the projected height map. A pixel in the projected height map may have a different height value than a pixel in the original height map corresponding to the same point on the surface in the model space.

In one embodiment, processing logic computes a difference between the vector representing the original viewing direction (i.e. vector normal to the plane of the intraoral scan) and the vector representing the average surface normal of the intraoral scan. If the difference is less than a difference threshold, then the operations of block 405 may be omitted. The original viewing direction may be close enough to the average surface normal that sufficiently accurate results can be achieved without computing and using the average surface normal for the intraoral scan. In general, a height map having an original scan direction (capture direction or viewing angle) may provide inferior results when used to detect artifacts if the original scan direction is at a sharp angle to a scanned surface. Accordingly, the difference threshold may be set such that a projected height map will be generated for images having an original scan direction that is at a sharp angle to the surface scanned. If the difference is greater than or equal to the difference threshold, then the operations of block 405 may be performed.

Figure 5:
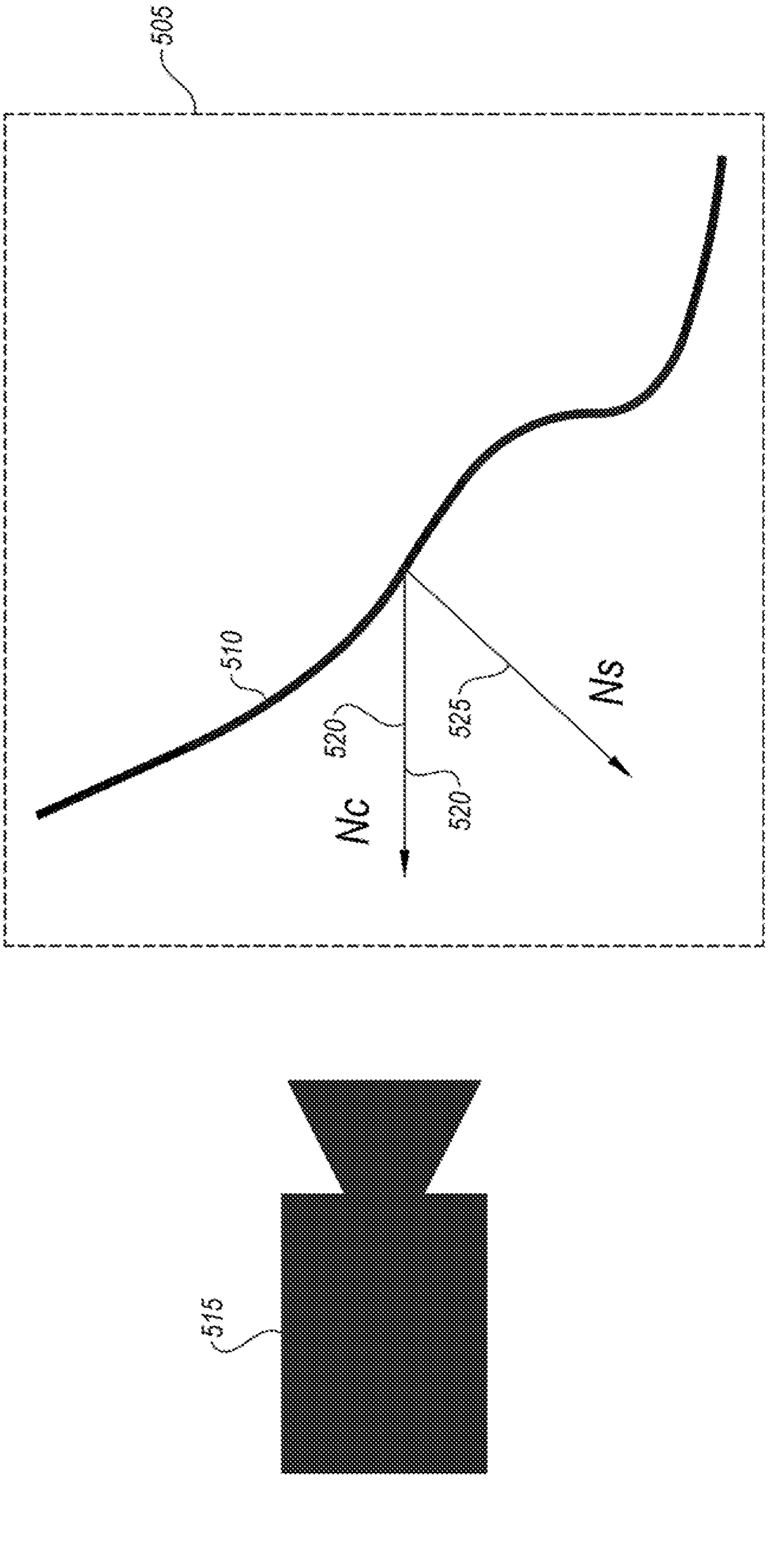
FIG. 5 illustrates an example intraoral scan, including a first vector associated with a camera angle and a second vector representing an average surface normal of a surface in the intraoral scan, in accordance with embodiments of the present disclosure.

FIG. 5 illustrates an example intraoral scan 505, including a first vector Nc 520 associated with a camera angle 515 (original viewing direction) and a second vector Ns 525 representing an average surface normal of a surface 510 in the intraoral scan, in accordance with embodiments of the present disclosure.

Some types of intraoral scanners do not generate height maps, and instead generate other scan data that is usable to determine 3D surface data. Intraoral scans generated by such scanners may not include height maps. For such intraoral scans, height maps may be generated by computing the 3D surface from an intraoral scan in model space, computing an average surface normal for the 3D surface, and then projecting that 3D surface onto a plane that is orthogonal to the average surface normal.

Returning to FIG. 4, at block 408 processing logic extrapolates either the projected height map (if a projected height map was generated) or the original height map (if no projected height map was generated). Extrapolation may be performed to increase a size of the surface depicted in the height map and/or to fill in voids in the height map. In embodiments, the extrapolation may include expanding the height map using an image in-painting technique, such as an image in-painting technique based on the fast marching algorithm. For example, a gradient may be computed for each point at an edge of a surface in the height map, and height values for points near the edge may be extrapolated using the gradient, thus filling in holes and expanding the width of the surface.

At block 410, processing logic determines whether an intraoral scanning session is complete (i.e., whether all scans have been generated). If the intraoral scanning session is not complete, then the method returns to block 402 and another intraoral scan is received and pre-processed. If the intraoral scanning session is complete, and there are no new intraoral scans to pre-process, the method ends.

Figure 6:
FIG. 6 illustrates a set of example intraoral scans of a dental site during various stages of pre-processing, in accordance with embodiments of the present disclosure.

FIG. 6 illustrates a set of example height maps of a dental site during various stages of pre-processing, in accordance with embodiments of the present disclosure. A first height map 605 corresponds to an original intraoral scan that was generated by an intraoral scanner. A second height map 610 is a projected height map that has been generated by projecting the first height map 605 into model space and then re-projecting a 3D surface from the model space onto a plane orthogonal to an average surface normal of the 3D surface. Height map 615 is an extrapolated height map 615 that has been generated by performing extrapolation on projected height map 610. As shown, the extrapolated height map is slightly wider than projected height map 610 and most of the voids in the original and projected height maps 605, 610 are filled in for extrapolated height map 615.

Figure 7:
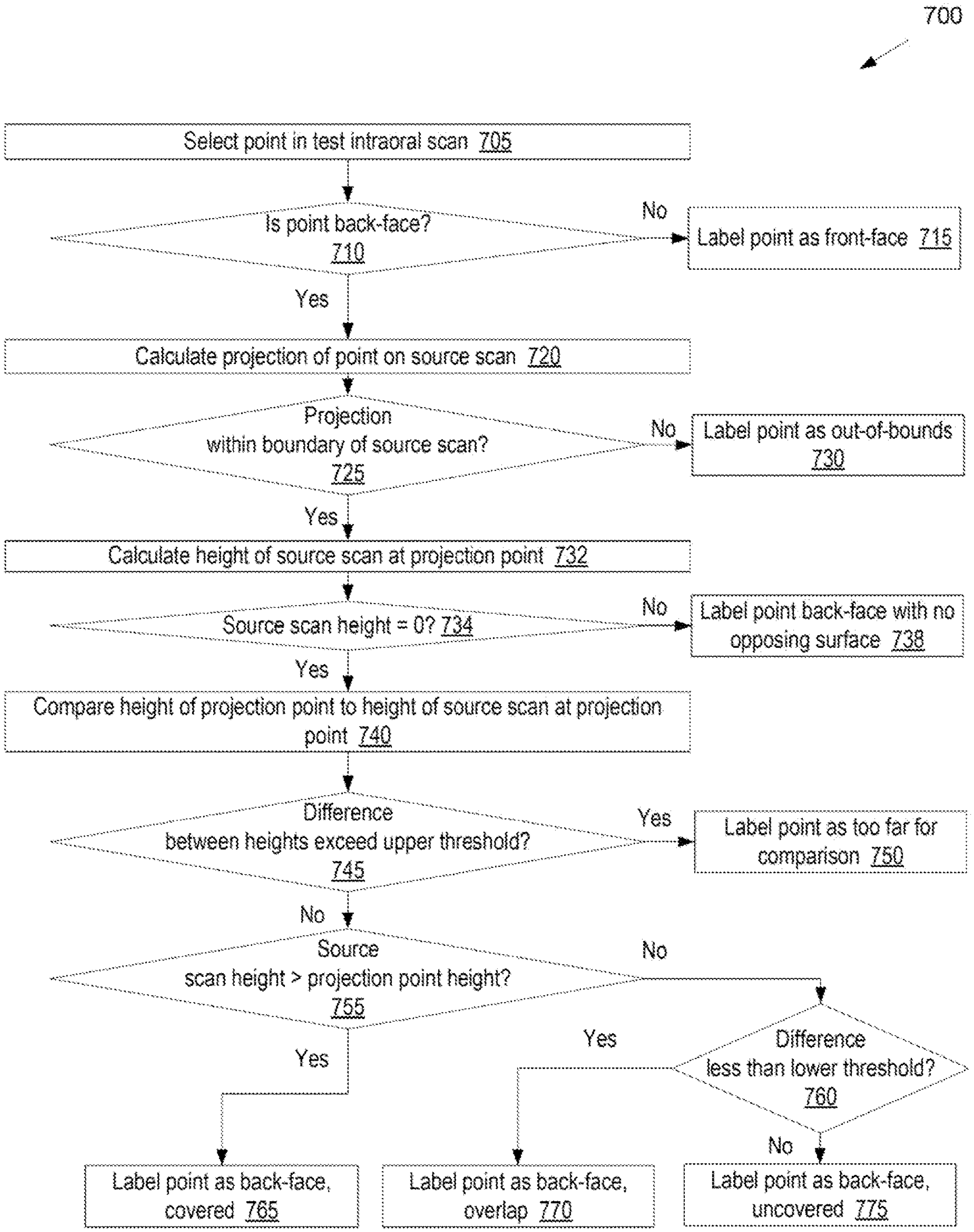
FIG. 7 illustrates a flow diagram for a method of labeling points in an intraoral scan based on a comparison of the intraoral scan with another intraoral scan, in accordance with embodiments of the present disclosure.

FIG. 7 illustrates a flow diagram for a method 700 of labeling points in an intraoral scan (test scan) based on a comparison of the intraoral scan with another intraoral scan (source scan), in accordance with embodiments of the present disclosure. Method 700 may be performed separately for each point in a test scan based on a comparison between the test scan and a source scan. Operations of method 700 may be performed, for example, at block 306 and/or at block 308 of method 300.

At block 705 of method 700, processing logic selects a point in a test intraoral scan (scan being analyzed to identify artifacts). The test intraoral scan may be compared to a source intraoral scan in order to identify artifacts. The source scan may be an intraoral scan that has an intersecting bounding box with a bounding box of the test scan.

At block 710, processing logic determines whether the point is a back-face point. To determine whether the point is a back-face point, processing logic may compute a surface normal of the point. Processing logic may then determine whether the surface normal at the point is co-directional with a viewing direction associated with the source scan. This may be determined by calculating a dot product of the surface normal (a vector) with a vector representing the viewing direction of the source scan. In some embodiments, the source scan includes a projected height map, and the viewing direction of the source scan is based on the average surface normal of the surface depicted in the source scan rather than on an original camera direction of a camera that generated the intraoral scan in some embodiments. Alternatively, the viewing direction may be represented by a vector that corresponds to the original viewing direction. If the result of the dot product is a negative value, then this indicates that the point is a back-face point. If the result of the dot product is a positive value, then this indicates that the point is a front-face point. If the point is not a back-face point (i.e. the dot produce has a positive value), the method continues to block 715, and the point is labeled as a front-face point. If the point is a back-face point, then the point may be labeled as a back-face point. Alternatively, or additionally, the method may proceed to block 720.

At block 720, processing logic calculates a projection of the point on the source scan. A first transformation matrix may be generated for the test scan, where the first matrix represents a transformation from a first scan space of the test scan to model space. A second transformation matrix may also be generated for the source scan, where the second matrix represents a transformation from a second scan space of the source scan to the model space. The projection of the point onto the source scan may be computed by multiplying the first and second transformation matrices to determine a transformation from the first scan space of the test scan to the second scan space of the source scan. Coordinates of the point on the test scan may be multiplied by the transformation matrices to obtain corresponding coordinates of the point in the source scan. The point is therefore projected from the first scan space to the second scan space. This can enable the point in the source scan that corresponds to the selected point in the test scan to be determined.

At block 725, processing logic determines whether the projection of the point onto the source scan is within a boundary of the source scan. Each intraoral scan has a height and depth that represents a boundary of the scan. If the selected point from the test scan projects to a point in the source scan space that is outside of the boundary of the source scan (e.g., position $x=-1$ or 101 for a source scan having a boundary at $x=0$, a boundary at $x=100$, a boundary at $y=0$ and a boundary at $y=50$), then the point has no corresponding point in the source scan. Accordingly, if the projection of the point is outside of the boundary of the source scan, the method continues to block 730 and the point in the test scan is labeled as an out-of-bounds point. If the projected point is within the boundary of the source scan, the method proceeds to block 732.

At block 732, processing logic calculates a height of the source scan at the point (i.e. pixel) on the source scan that corresponds to the projection of the selected point from the test scan as computed at block 720. At block 734, processing logic determines whether the height of the source scan at the point is zero. If the height of the source scan at the point is zero, this means that no surface is represented at the point in the source scan. This may be because there is a hole or void in the source scan at the point, or because there was no surface to detect at that location when the source scan was generated. If the scan height of the point on the source scan that corresponds to the projection of the selected point from the test scan is zero, the method continues to block 738 and the selected point in the test scan is labeled as a back-face with no opposing surface point. Such points may be candidate points for artifacts (e.g., flaps). If the scan height is not zero, the method proceeds to block 740.

At block 740, processing logic compares the height of the projection point (i.e. projection of the selected point onto the source scan) to the height of the source scan at the projection point. At block 745, processing logic determines whether a difference between the heights exceeds an upper threshold. If the distance exceeds the upper threshold, this may mean that the points are too far apart to represent depictions of the same dental site. In such instances the method proceeds to block 750, and the point in the test scan is labeled as too far away for comparison in an embodiment. Example upper threshold differences are 5-20 mm (e.g., 5 mm, 10 mm, 15 mm, or 20 mm), though other threshold distances may also be used. If the difference is less than the upper threshold, the method proceeds to block 755.

At block 755, processing logic determines whether the height of the source scan at the projection point is greater than the height of the projection point. If the source scan has a greater height at the point, the method continues to block 765, and the point in the test scan may be labeled as a covered back-face point (e.g., the point is behind the source scan from the viewing direction of the source scan). If the source scan has a lesser or equal height at the point, the method continues to block 760.

At block 760, processing logic may determine whether the difference between the height of the source scan at the projection point and the height of the point on the test scan projected onto the projection point is less than or equal to a lower threshold. If the distance is less than or equal to the lower threshold, this may mean that the points are overlapping. The lower threshold may be 0 mm, 0-1 mm (e.g., 0.1 mm, 0.2 mm, 0.5 mm, etc.), or some other difference value. If the distance is less than or equal to the difference value, the method proceeds to block 770, and the point on the test scan is labeled as an overlap back-face point. If the distance is greater than the difference value, then the point is labeled as an uncovered back-face point at block 775. Such points may represent potential artifacts.

Figure 8:
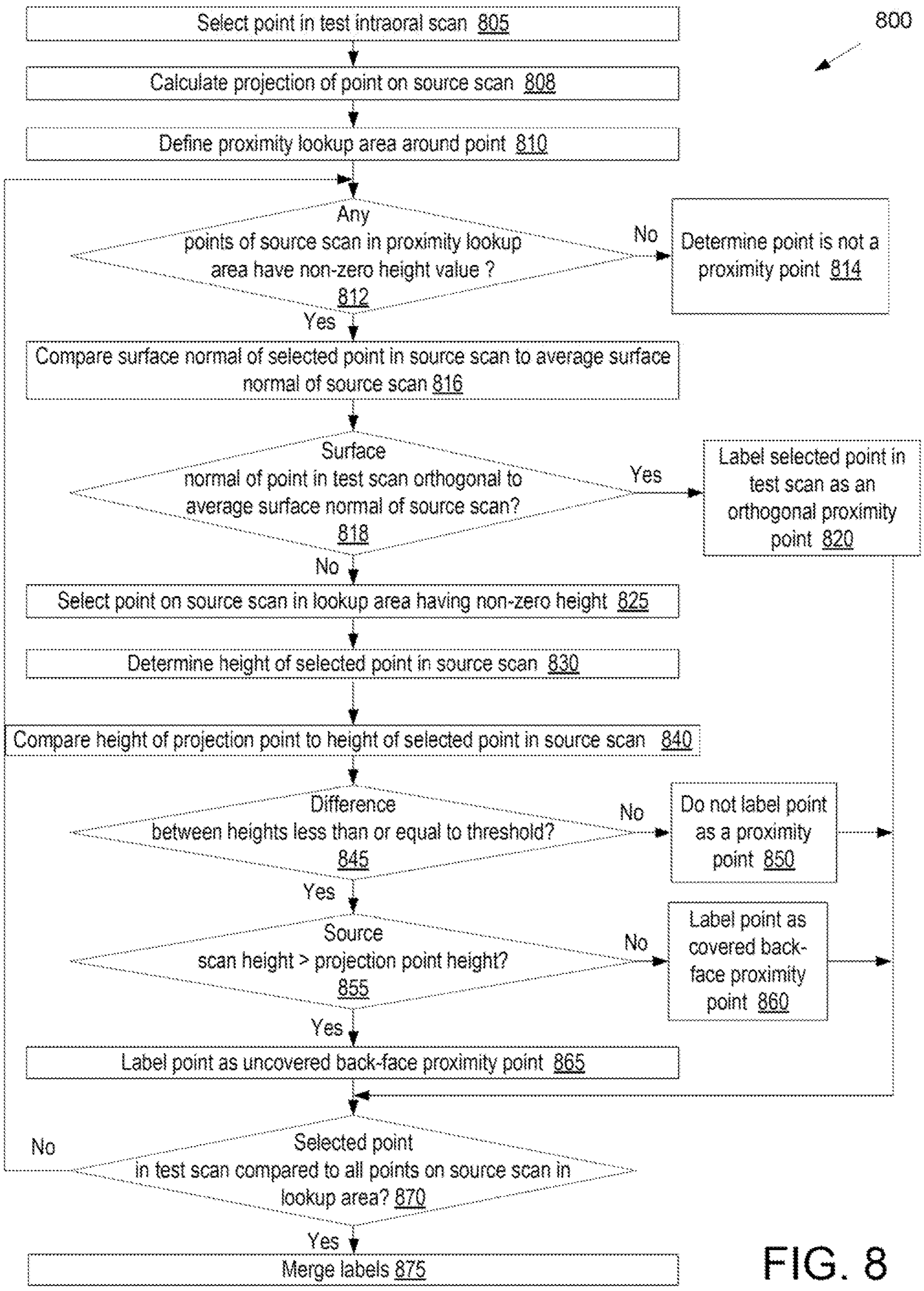
FIG. 8 illustrates another flow diagram for a method of labeling points in an intraoral scan based on a comparison of the intraoral scan with another intraoral scan, in accordance with embodiments of the present disclosure.

FIG. 8 illustrates another flow diagram for a method 800 of labeling points in an intraoral scan based on a comparison of the intraoral scan with another intraoral scan, in accordance with embodiments of the present disclosure. Method 800 may be performed separately for each point in a test scan based on a comparison between the test scan and a source scan. Method 700 covers labeling based on comparison of points in the test scan to corresponding points in the source scan. In some embodiments, further comparisons are also made between projections of points from the test scan onto corresponding points in the source scan as well as between the projections of the points from the source scan and additional points in the source scan that are proximate to the point in the source scan onto which the projection of the point from the test scan falls. In some embodiments, method 700 and method 800 are both performed to label points in a test scan. For example, method 700 may be performed, followed by method 800.

In one embodiment, at block 780 of method 700 if the determined difference is not less than the lower threshold, then the operations of block 775 are not performed and instead method 800 is performed starting at block 810.

At block 805 of method 800, processing logic selects a point in the test intraoral scan. Alternatively, a point may already have been selected (e.g., if method 800 is being performed following method 700 on a point in the test scan already selected in method 700).

At block 808, processing logic calculates a projection point, which is a projection of the test scan point onto the source scan, as discussed above with reference to block 720 of method 700. Alternatively, such a projection may already have been calculated (e.g., if method 800 is being performed following method 700 on a point in the test scan already selected in method 700).

At block 810, processing logic defines a proximity lookup area around the projection of the selected point onto the source scan. The proximity lookup area may include all points that are within a threshold distance from the projection point. In one embodiment, the lookup area is approximately a circle centered on the projection point. In one embodiment, the lookup area is a square or rectangle centered on the projection point. All points that are within the boundary of the proximity lookup area (e.g., within the boundary of the square, circle or rectangle centered on the selected projection point) are part of the proximity lookup area.

At block 812, processing logic determines whether any points of the source scan that are in the proximity lookup area of the projection of the point of the test scan onto the source scan have a non-zero height value. If none of the points on the source scan in the proximity lookup area have a non-zero height value, then the point on the test scan is not in proximity to a surface on the source scan. Accordingly, the method continues to block 814 and processing logic determines that the point in the test scan is not a proximity point. If at least one point on the source scan in the proximity lookup area has a non-zero height value, then the point in the test scan is a proximity point, and the method continues to block 816.

At block 816, processing logic compares a surface normal of the selected point in the test scan to the average surface normal of the source scan. At block 818, processing logic determines whether the surface normal of the selected point in the test scan is orthogonal or approximately orthogonal to the average surface normal of the source scan. This determination can be made by calculating the dot product of the surface normal of the selected point in the test scan and the average surface normal of the source scan. If the dot product has a value that is close to zero (e.g., less than 0.1), then the point is determined to be approximately orthogonal to the average surface normal (and to the viewing direction) of the source scan. If the surface normal of the point in the test scan is orthogonal (or close to orthogonal) to the average surface normal, then the method proceeds to block 820. Otherwise the method continues to block 825.

At block 820 processing logic labels the selected point in the test scan as an orthogonal proximity point. The method then continues to block 870.

At block 825, processing logic selects a point on the source scan that is within the lookup area and optionally that has a non-zero height.

At block 830, processing logic determines a height of the selected point in the source scan.

At block 840, processing logic compares a height of the projection point to the height of the selected point in the source scan. At block 845, processing logic determines whether a difference between the two heights is less than or equal to a threshold difference. If the difference is greater than the difference threshold, the method continues to block 850 and the point in the test scan is not labeled as a proximity point, after which the method proceeds to block 870. If at block 845 processing logic determines that the difference between the two heights is less than or equal to the difference threshold, the method continues to block 855.

At block 855, processing logic determines whether the height of the selected point in the source scan is greater than the height of the projection point. If the source scan height is greater than the projection point height, the method continues to block 865. Otherwise the method continues to block 860 and the point in the test scan is labeled as a covered back-face proximity point. The method then proceeds to block 870.

At block 865, processing logic labels the point in the test scan as an uncovered back-face proximity point.

At block 870, processing logic determines whether the selected point in the test scan has been compared with all of the points in the lookup area. If comparisons have not yet been made with all of the points on the source scan in the lookup area, the method returns to block 815 and a new point on the source scan in the lookup area is selected. If comparisons have been made to all points on the source scan in the lookup area, the method continues to block 875.

As shown, various different types of proximity point labels may be applied to a point in the test scan. Some types of proximity points (e.g., uncovered back-face proximity points) may be included in a region designated as an artifact, while other types of proximity points (e.g., covered back-face proximity points and/or orthogonal proximity points) may not be included in a region designated as an artifact. The different types of proximity point labels may be used to identify as large a proximity area as possible, while also preserving an ability to assign some of the proximity points as artifacts and remove them while also assigning other proximity points as solid surface and preserving them. All of the types of proximity point labels indicate that a point on the test scan is in close proximity to a surface in the source scan.

At block 875, processing logic merges the labels that have been assigned to the point in the test scan. The point may have accumulated multiple labels based on the comparison of the point to multiple different source scan points in the lookup area. Additionally, the point may have received a label from method 700. Each of the different labels may be associated with a priority rating. The label with the highest priority rating that has been assigned to the point in the test scan may be selected, and the other labels may be ignored, removed or dropped. In one embodiment, labels have the following priority ratings:

1. Covered back-face proximity point
2. Back-face overlap point
3. Orthogonal back-face proximity point
4. Uncovered back-face proximity point
5. Covered back-face point
6. Uncovered back-face point
7. Back-face with no opposing surface point
8. Out-of-bounds point
9. Front-face point Once all of the points in a test scan have been assigned labels, regions that include groups of points that share labels and/or that include particular subsets of labels may be determined. For example, one or more proximity areas or proximity regions may be determined, where each proximity region may include all neighboring points that are labeled as any type of proximity point (e.g., points labeled as covered back face proximity points, orthogonal back-face proximity points, or uncovered back-face proximity points). One or more out-of-bounds region may be determined that includes neighboring points with out-of-bounds labels. One or more potential artifact regions may be determined, each of which may include neighboring points labeled as uncovered back-face proximity points, uncovered back-face points, or back-face with no opposing surface points. Other types of regions may also be determined.

Figure 9A:
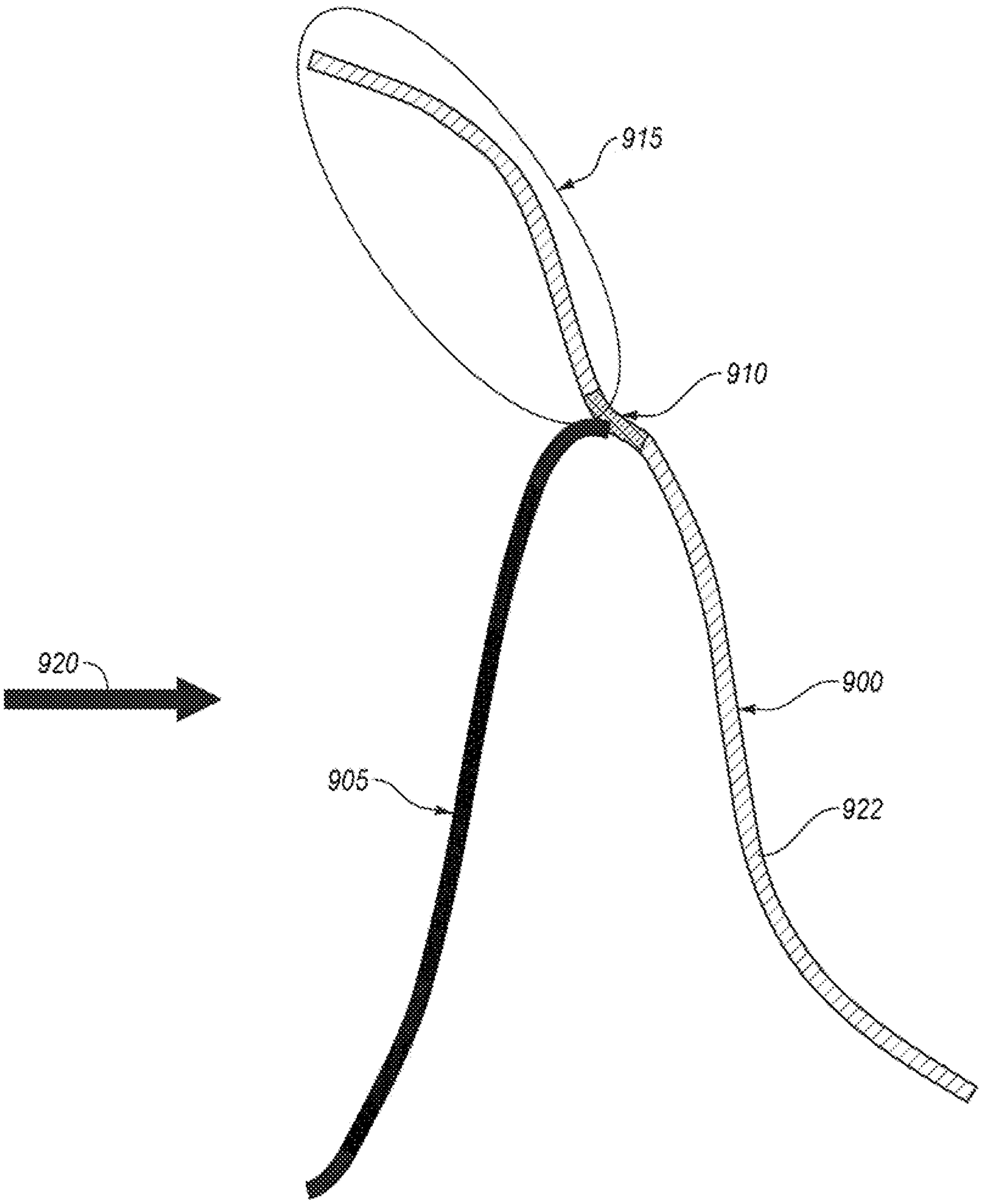
FIG. 9A illustrates labeled regions on an intraoral scan based on a comparison of the intraoral scan with another intraoral scan, in accordance with embodiments of the present disclosure.

FIG. 9A illustrates labeled regions on a test intraoral scan 900 based on a comparison of the test intraoral scan 900 with a source intraoral scan 905, in accordance with embodiments of the present disclosure. As shown, the source intraoral scan 905 is associated with a viewing direction 920. A first region 922 of the test scan 920 is covered by the source scan 905 when viewed from the viewing direction 920. A second region 915 of the test scan 900 is not covered by the source scan 905, and represents an artifact (e.g., a flap). A third region 910 is a proximity region that separates the first region 922 and the second region 915.

Figure 9B:
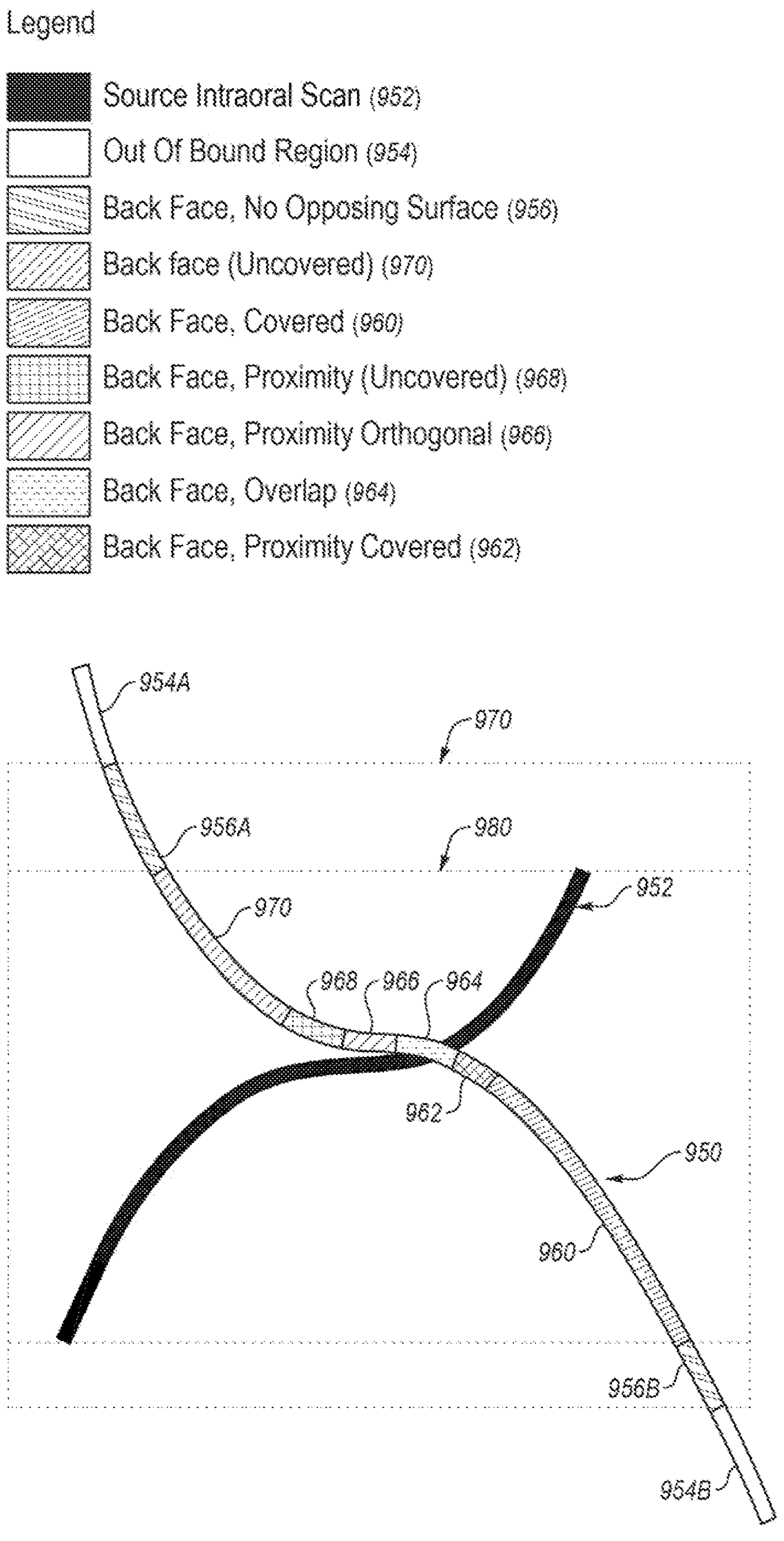
FIG. 9B illustrates labeled points on an intraoral scan based on a comparison of the intraoral scan with another intraoral scan, in accordance with embodiments of the present disclosure.

FIG. 9B illustrates more detailed labeled regions on a test intraoral scan 950 based on a comparison of the test intraoral scan 950 with a source intraoral scan 952, in accordance with embodiments of the present disclosure. As shown the source intraoral scan 952 is associated with a scan boundary 970. The test intraoral scan 950 includes two out-of-bounds regions 954A, 954B that contain points labeled as out-of-bounds points. Additionally, the source intraoral scan 952 includes a captured surface represented by boundary 980. Test intraoral scan 950 includes two back-face with no opposing surface regions 956A, 956B that contain points labeled as back-face no opposing surface. The test scan 950 additionally includes a covered back-face surface region 960 containing covered back-face points, a covered back-face proximity region 962 containing covered back-face proximity points, a back-face overlap region containing back-face overlap points, an orthogonal back-face region 966 containing orthogonal back-face points, a back-face proximity region 968 containing back-face proximity points, and an uncovered back-face region 970 containing uncovered back-face points.

Figure 10:
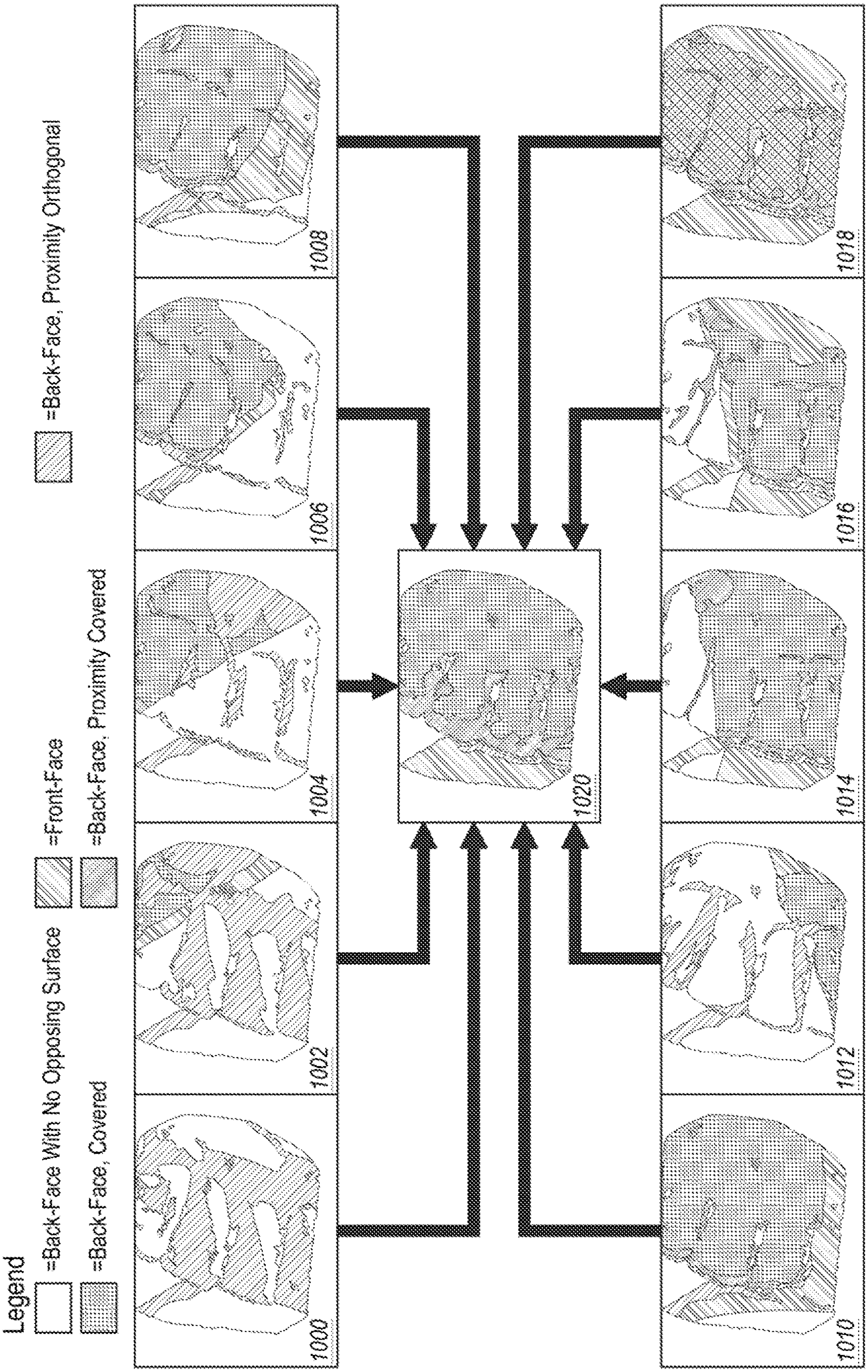
FIG. 10 illustrates a plurality of labeled versions of an intraoral scan based on comparisons of the intraoral scan with other intraoral scans, in accordance with embodiments of the present disclosure.

FIG. 10 illustrates a plurality of labeled versions of an intraoral scan 1000-1018 based on comparisons of the intraoral scan with other intraoral scans, in accordance with embodiments of the present disclosure. These multiple labeled versions of the intraoral scan 1000-1018 may be combined, and labeling may be updated by selecting a label for each point that has a highest priority rating among the labels assigned to that point from all of the labeled versions of the intraoral scan. A final labeled version of the intraoral scan 1020 may then be produced.

Figure 11:
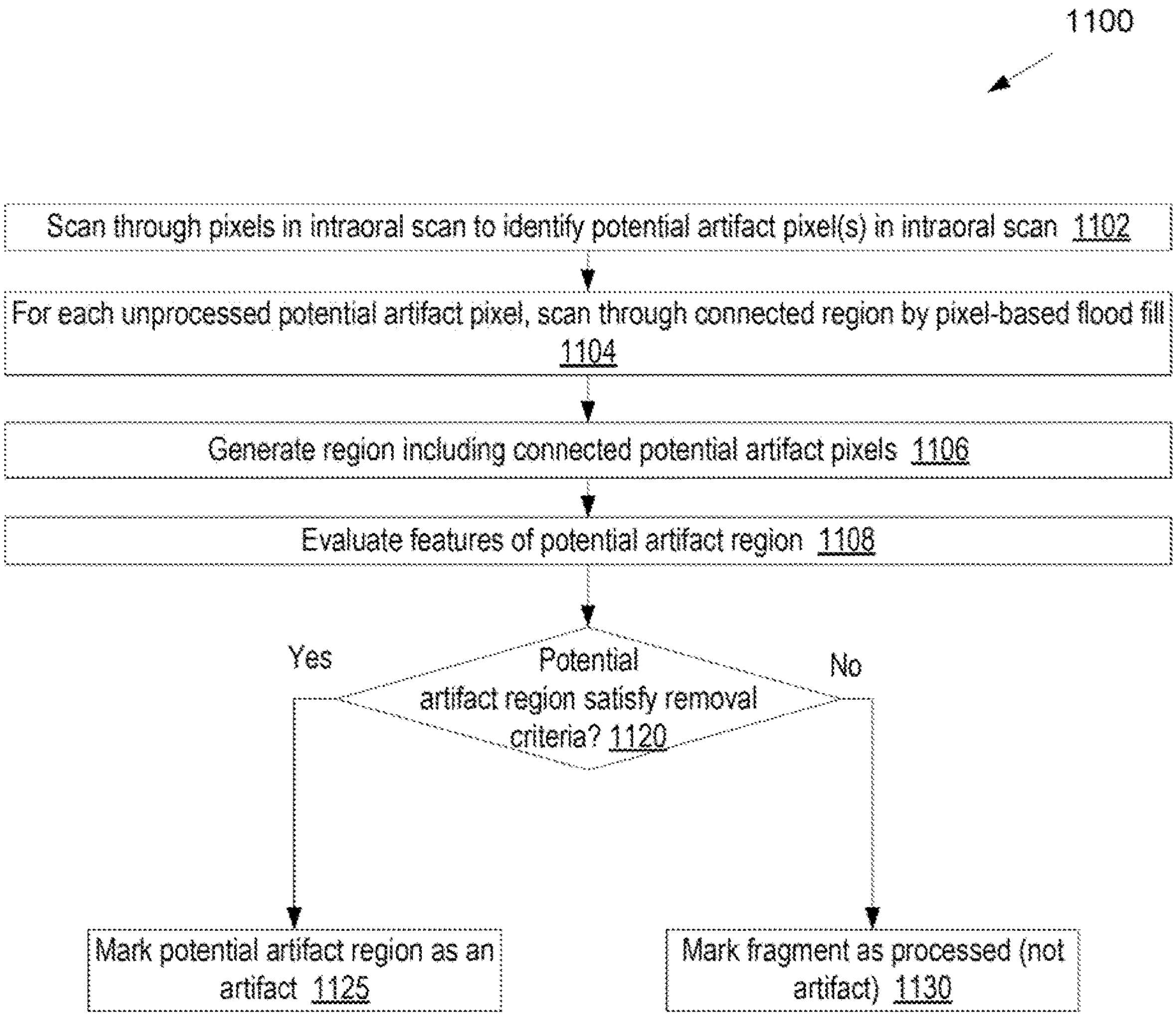
FIG. 11 illustrates a flow diagram for a method of identifying a region containing excess material, in accordance with embodiments of the present disclosure.

FIG. 11 illustrates a flow diagram for a method 1100 of identifying a region containing excess material, in accordance with embodiments of the present disclosure. At block 1102 of method 1100, processing logic scans through (i.e. reviews) pixels (i.e. points) in an intraoral scan (i.e. a test scan) to identify one or more pixel that has been assigned a label that indicates that the pixel is potentially depicting an artifact (e.g., a flap or excess material). Potential artifact pixels may be pixels that are labeled as uncovered back-face pixels in an embodiment. In a further embodiment, potential artifact pixels are pixels that are labeled as one or more of uncovered back-face points, back-face with no opposing surface points, or back-face uncovered proximity points.

At block 1104, processing logic scans through a connected region of pixels that are connected to (e.g., proximate to or surrounding) the pixel that was identified as a potential artifact pixel. Processing logic determines, for each of the pixels surrounding a potential artifact pixel, whether those pixels are also potential artifact pixels. Those surrounding pixels that are also potential artifact pixels are identified as being connected to the originally identified potential artifact pixel. Each of the pixels surrounding each of the additional potential artifact pixels are then analyzed to determine whether any of those pixels are also potential artifact pixels. This process continues until no further surrounding pixels of any processed pixel are identified as being potential artifact pixels. In one embodiment, a pixel-based flood fill technique is used to identify connected pixels that are all potential artifact pixels.

At block 1106, processing logic generates or identifies a region (also referred to as a connected region) that includes connected potential artifact pixels identified at block 1104. The region may be a potential artifact region. The operations of block 1104 and 1106 may be performed to identify one or multiple connected artifact regions of a test scan. The operations of blocks 1104 and 1106 may also be performed to identify and/or generate one or more other types of regions of connected points, such as a proximity region, a solid surface region, and so on. A proximity region may contain connect pixels labeled as proximity points (e.g., as covered back-face proximity points, orthogonal back-face proximity points, or uncovered back-face proximity points). Similarly, an overlap region may be determined that includes connected pixels labeled as back-face overlap points. Similarly, a solid surface region may be determined that includes connected pixels labeled as front-face points, covered back-face proximity points, back-face overlap points, orthogonal back-face proximity points, and/or covered back-face points. Other types of regions may also be determined.

At block 1108, processing logic evaluates features of the potential artifact region. Such analysis is described in greater detail below with reference to FIG. 12.

At block 1120, processing logic determines whether the potential artifact region satisfies one or more removal criteria based on a result of the evaluation performed at block 1108. If the potential artifact region does satisfy the one or more removal criteria, the method continues to block 1125. Otherwise the method proceeds to block 1130.

At block 1125, processing logic marks the potential artifact region as an artifact (e.g., as a region depicting a flap).

At block 1130, processing logic marks the potential artifact region as being processed. The potential artifact region is not marked as an artifact.

Figure 12:
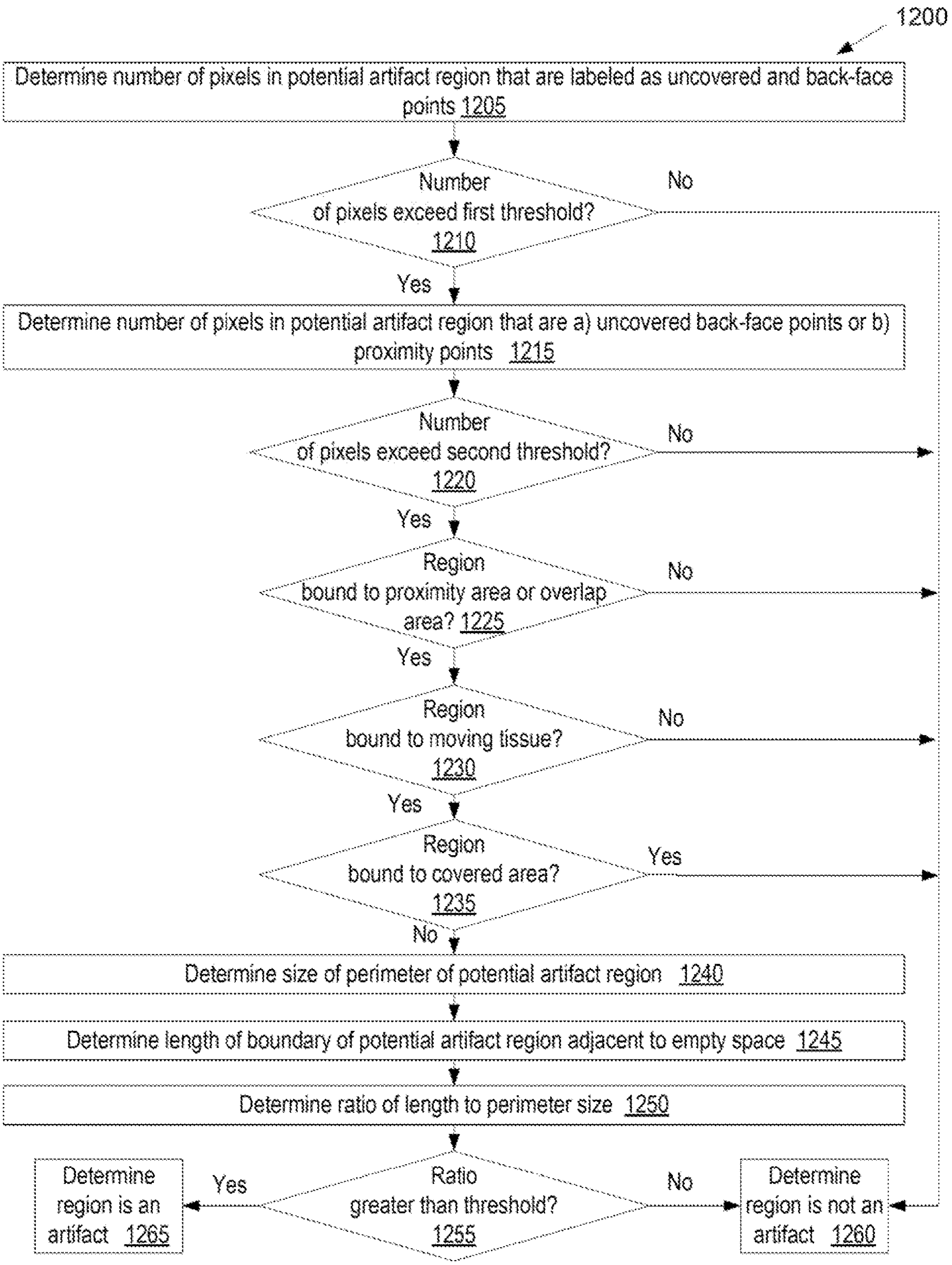
FIG. 12 illustrates a flow diagram for a further method of identifying a region containing excess material, in accordance with embodiments of the present disclosure.

FIG. 12 illustrates a flow diagram for a further method 1200 of identifying a region containing excess material, in accordance with embodiments of the present disclosure. In one embodiment, operations of method 1200 are performed at blocks 1108, 1120, 1125 and/or 1130 of method 1100.

At block 1205 of method 1200, processing logic determines a number of pixels in a potential artifact region that are labeled as uncovered back-face points. Processing logic may also determine a number of pixels in the potential artifact region that are labeled as back-face with no opposing surface points, and add the number of pixels labeled as back-face with no opposing surface points to the number of pixels labeled as uncovered back-face points in an embodiment. In a further embodiment, processing logic may determine a total number of pixels in the potential artifact region that have any type of back-face label (e.g., covered back-face proximity point, back-face overlap point, orthogonal back-face proximity point, uncovered back-face proximity point, covered back-face point, uncovered back-face point, back-face with no opposing surface point), or that have some predefined subset of the various types of back-face point labels.

At block 1210, processing logic determines whether the number of pixels determined at block 1205 exceeds a first threshold. In one embodiment, the first threshold is about 20-100 pixels. If the number of pixels does not exceed the first threshold, then the method continues to block 1260 and processing logic determines that the potential artifact region does not depict an artifact. If the number of pixels does exceed the first threshold, the method continues to block 1215.

At block 1215, processing logic determines a number of pixels in the potential artifact region that are either labeled as uncovered back-face points or as some type of proximity points. In one embodiment, the second threshold is about 20-100 pixels. The second threshold may be higher than the first threshold in embodiments. At block 1220, processing logic determines whether the number of pixels determined at block 1215 exceeds a second threshold. If the number of pixels exceeds the second threshold, the method proceeds to block 1225. Otherwise, the method continues to block 1260 and processing logic determines that the potential artifact region does not depict an artifact.

A proximity region (also referred to as a proximity area) containing connected pixels labeled as proximity points and an overlap region (also referred to as an overlap area) containing connected pixels labeled as overlap points (e.g., as back-face overlap points) may have been previously determined. Alternatively, these regions may be determined at block 1225. At block 1225, processing logic determines whether the potential artifact region bounds to (e.g., is adjacent or proximate to) either an overlap area or a proximity area. If so, the method continues to block 1230. Otherwise, the method continues to block 1260 and processing logic determines that the potential artifact region does not depict an artifact.

A region of the test scan depicting moving tissue may have previously been identified using a moving tissue detection algorithm. At block 1230, processing logic determines whether the potential artifact region bounds to moving tissue. If so, the method continues to block 1235. Otherwise, the method continues to block 1260 and processing logic determines that the potential artifact region does not depict an artifact.

A covered region (also referred to as a covered area region) containing connected pixels labeled as covered points (e.g., as covered back-face proximity points or covered back-face points) may have been previously determined. Alternatively, these regions may be determined at block 1235. At block 1235, processing logic determines whether the potential artifact region bounds to (e.g., is adjacent or proximate to) a covered area. If the region does not bound to a covered region, the method continues to block 1240. Otherwise, the method continues to block 1260 and processing logic determines that the potential artifact region does not depict an artifact. This test prevents back-face pixels in the test scan that correspond to points on the surface scan that are voids or holes in the surface scan from being identified as artifacts.

At block 1240, processing logic determines a size of a perimeter of the potential artifact region. The size may be a number of pixels that define the perimeter of the potential artifact region. At block 1245, processing logic determines a length of a boundary of the potential artifact region that is adjacent to or bounds to empty space. The length may be a number of pixels (e.g., a number of connected pixels) that connects to empty space. At block 1250, processing logic determines a ratio of the length of the boundary of the potential artifact region that bounds to empty space to the size of the perimeter of the potential artifact region.

At block 1255, processing logic determines whether the ratio computed at block 1250 is greater than a ratio threshold. If the ratio is greater than the ratio threshold, then the method continues to block 1265 and processing logic determines that the potential artifact region depicts an artifact.

Processing logic may label the potential artifact region as an artifact region. If the region is not greater than the ratio threshold, the method continues to block 1260 and processing logic determines that the potential artifact region does not depict an artifact. At block 1260, the potential artifact region may be labeled as not being an artifact region. This test may avoid detection of artifacts for areas or regions that are close to voids in the scan surface.

A single pixel may be included in multiple different regions in some embodiments. For example, a pixel labeled as an uncovered back-face proximity point may be included in both a potential artifact region and a proximity region.

Figure 13B:
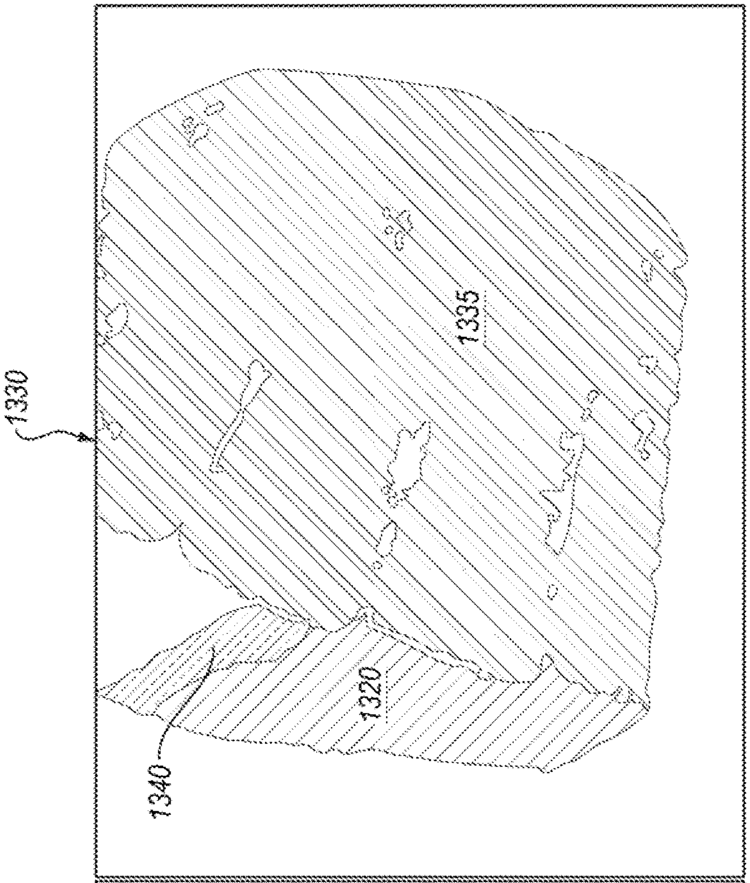
FIG. 13B illustrates an example labeled intraoral scan with an identified flap, in accordance with embodiments of the present disclosure.
Figure 13A:
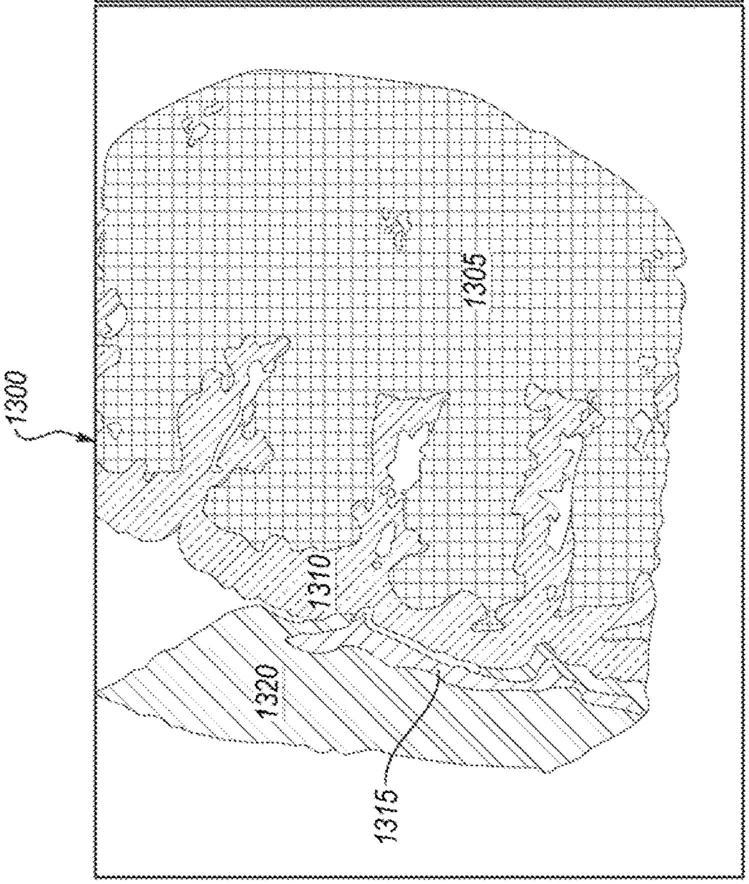
FIG. 13A illustrates an example labeled intraoral scan, in accordance with embodiments of the present disclosure.

FIG. 13A illustrates an example labeled intraoral scan 1300, in accordance with embodiments of the present disclosure. The pixels of the intraoral scan 1300 have been divided into a covered back-face region 1305, a proximity region 1310, an orthogonal back-face proximity region 1315 and a potential artifact region 1315.

FIG. 13B illustrates an example labeled intraoral scan 1330 with an identified flap, in accordance with embodiments of the present disclosure. The pixels of the intraoral scan 1330 have been divided into a non-artifact region 1335, an artifact region 1320 (e.g., a flap region), and a moving tissue region 1340. FIG. 13A depicts a target scan that has been labeled but that has not yet been processed accordingly to method 700 or 800. FIG. 13B depicts the target scan of FIG. 13A after the target scan has been processed according to method 700 and/or method 800.

Figure 14A:
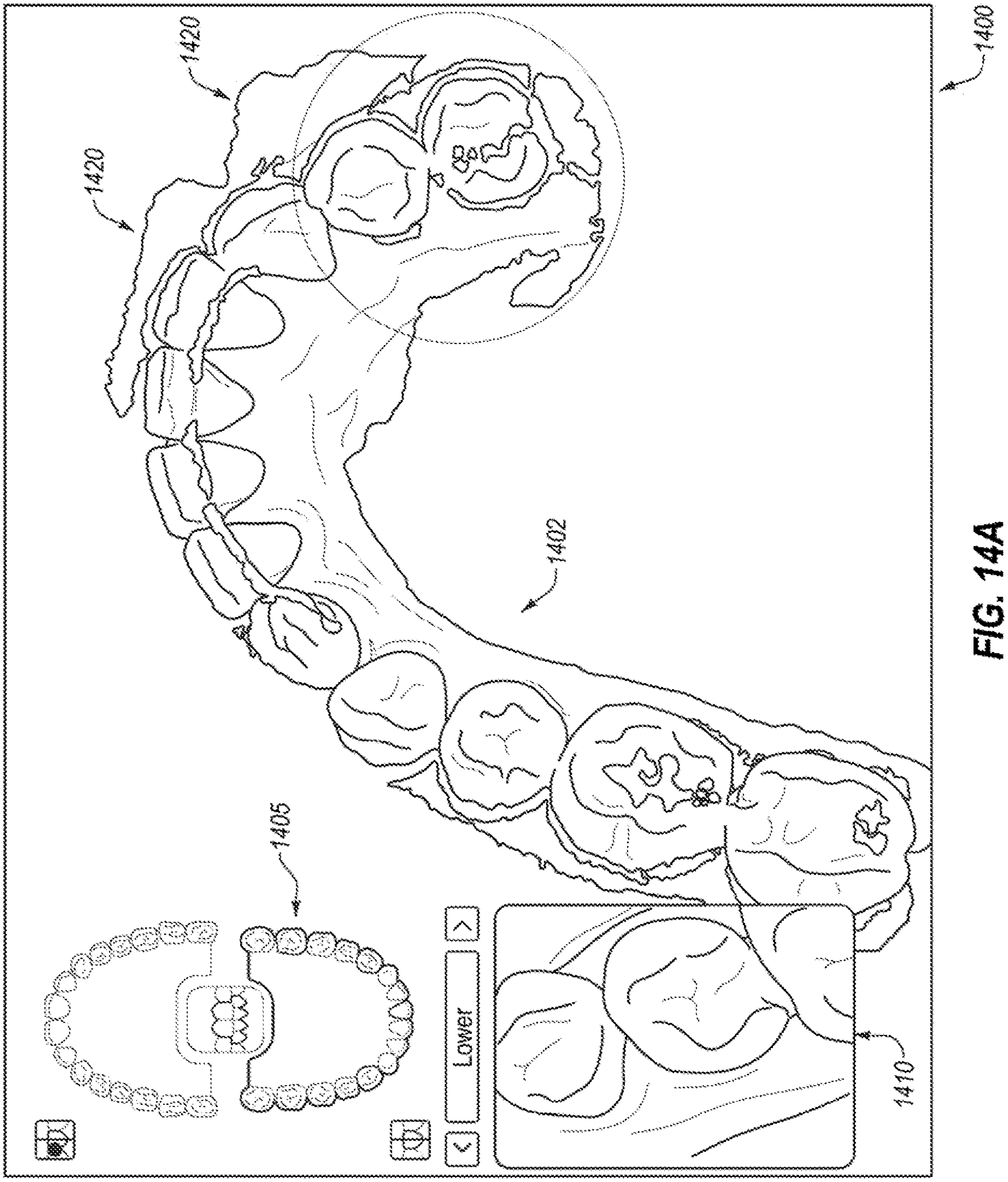
FIG. 14A illustrates a first example virtual 3D model of a dental arch with excess material that is generated during intraoral scanning, in accordance with embodiments of the present disclosure.

FIG. 14A illustrates a first example virtual 3D model 1402 of a dental arch with excess material that is generated during intraoral scanning, in accordance with embodiments of the present disclosure. In FIG. 14A a view of a graphical user interface 1400 presented during intraoral scanning is shown. The view of the graphical user interface 1400 includes the virtual 3D model, which is generated and updated on-the-fly as new intraoral scans are received during the intraoral scanning session. This virtual 3D model may be a lower quality virtual 3D model than a virtual 3D model generated from all intraoral scans from a scanning session after the scanning session is complete. The view of the graphical user interface 1400 additionally includes a viewfinder 1410 showing a current view of an intraoral scanner and a graphical depiction of a dental arch being scanned 1405. As shown, the virtual 3D model 1402 includes depictions of flaps 1420.

Figure 14B:
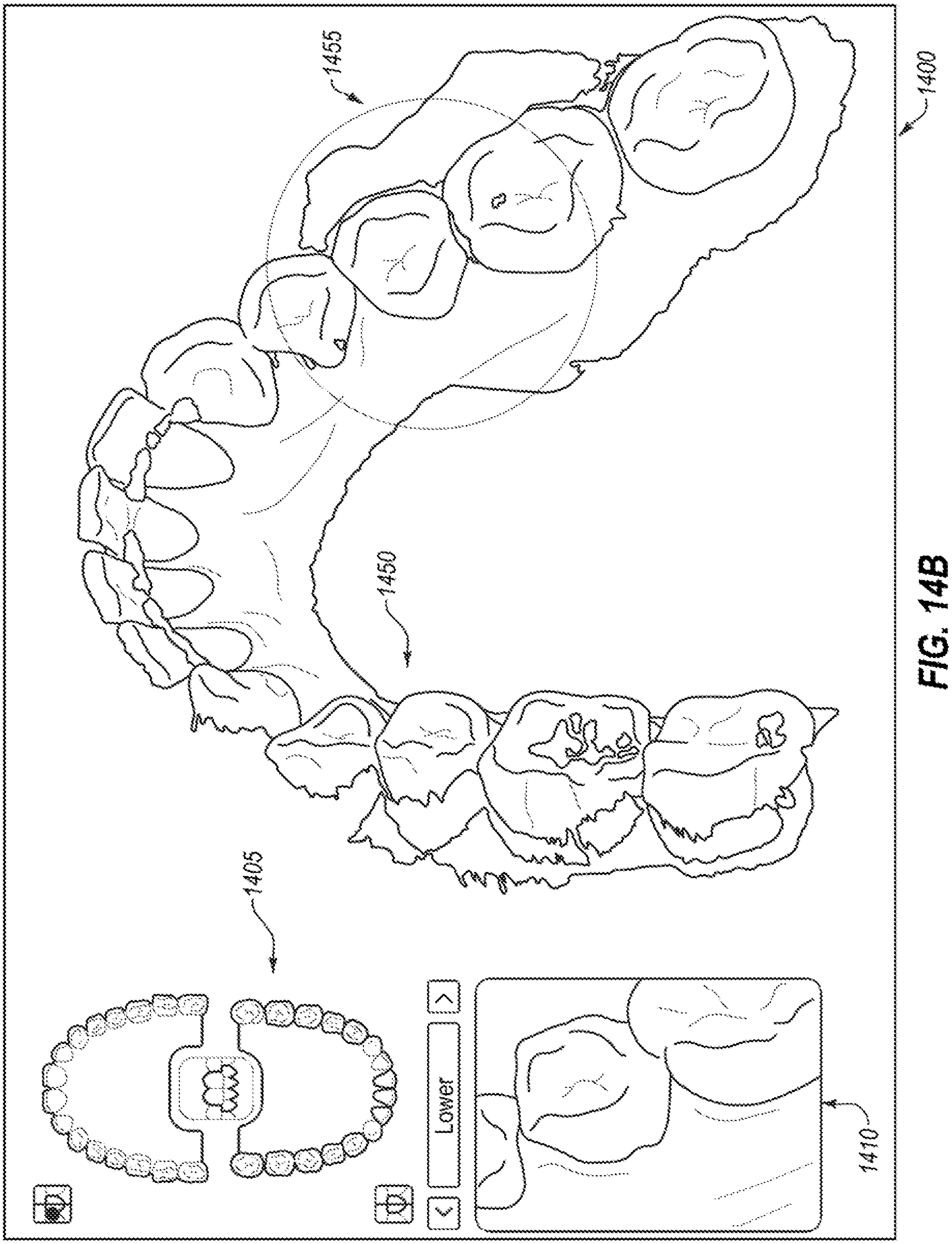
FIG. 14B illustrates a second example virtual 3D model of the dental arch of FIG. 14A in which some of the excess material from FIG. 14A has been removed, in accordance with embodiments of the present disclosure.

FIG. 14B illustrates a second example virtual 3D model of the dental arch of FIG. 14A in which some of the excess material from FIG. 14A has been removed, in accordance with embodiments of the present disclosure. In FIG. 14B the view of a graphical user interface 1400 is presented during the intraoral scanning. Further intraoral scans have been received, and these intraoral scans have been used to update the virtual 3D model, such that a new version of the virtual 3D model 1450 is shown. The techniques and methods descried above were performed on intraoral scans used to generate the virtual 3D model 1402 of FIG. 14A using the further intraoral scans as source scans and/or as test scans. This resulted in the flaps 1420 being removed from the intraoral scans and from the virtual 3D model, as depicted in the new version of the virtual 3D model 1450. However, new flaps 1455 associated with the further intraoral scans are depicted. These new flaps 1455 may be identified and removed based on still further intraoral scans to be received during the intraoral scanning session.

Figure 15:
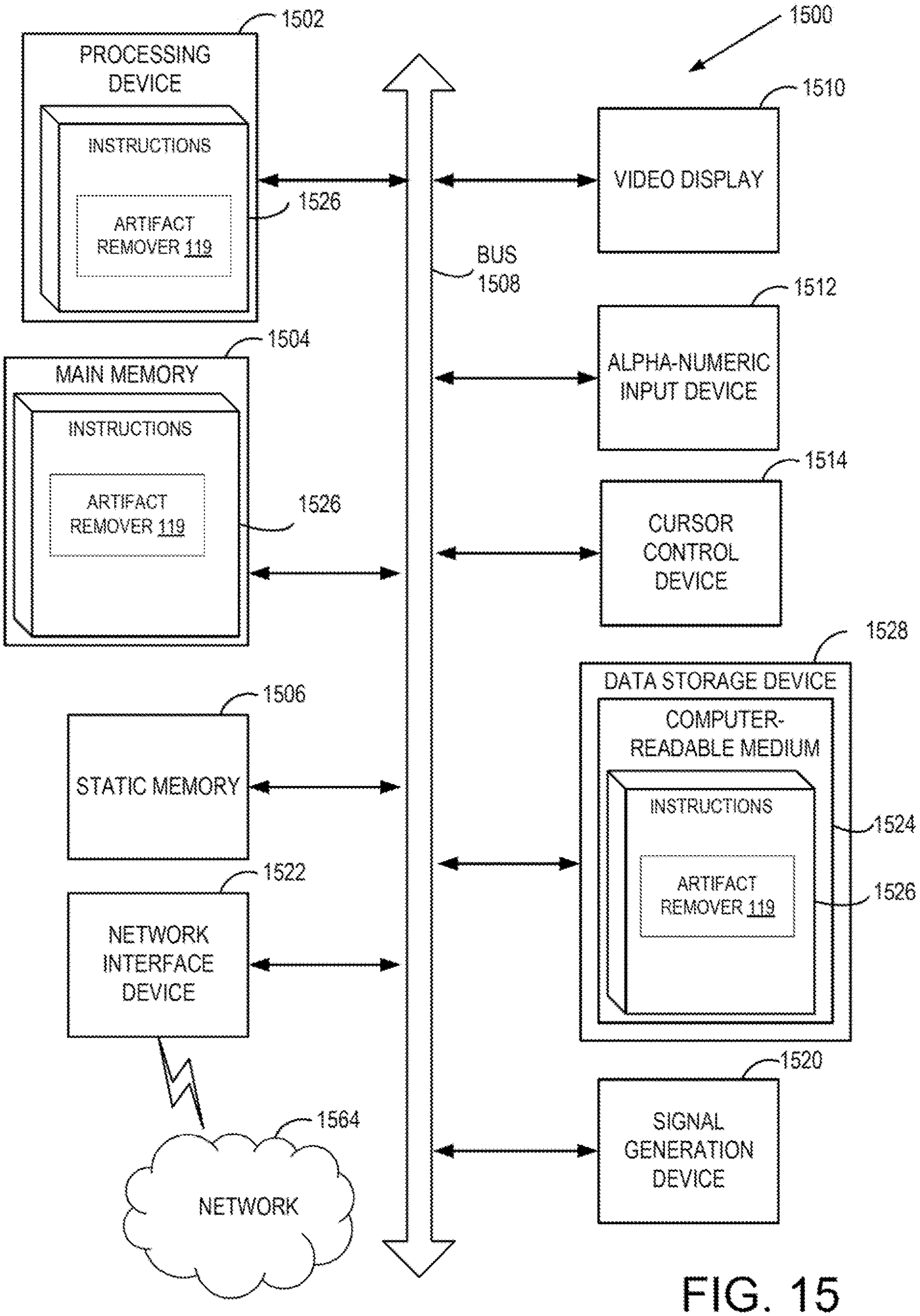
FIG. 15 illustrates a block diagram of an example computing device, in accordance with embodiments of the present disclosure.

FIG. 15 illustrates a diagrammatic representation of a machine in the example form of a computing device 1500 within which a set of instructions, for causing the machine to perform any one or more of the methodologies discussed above. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1500 includes a processing device 1502, a main memory 1504 (e.g., read-only memory (ROM), flash memory, dynamic random access memory (DRAM) such as synchronous DRAM (SDRAM), etc.), a static memory 1506 (e.g., flash memory, static random access memory (SRAM), etc.), and a secondary memory (e.g., a data storage device 1528), which communicate with each other via a bus 1508.

Processing device 1502 represents one or more general-purpose processors such as a microprocessor, central processing unit, or the like. More particularly, the processing device 1502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. Processing device 1502 is configured to execute the processing logic (instructions 1526) for performing operations and steps discussed herein.

The computing device 1500 may further include a network interface device 1522 for communicating with a network 1564. The computing device 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), and a signal generation device 1520 (e.g., a speaker).

The data storage device 1528 may include a machine-readable storage medium (or more specifically a non-transitory computer-readable storage medium) 1524 on which is stored one or more sets of instructions 1526 embodying any one or more of the methodologies or functions described herein. A non-transitory storage medium refers to a storage medium other than a carrier wave. The instructions 1526 may also reside, completely or at least partially, within the main memory 1504 and/or within the processing device 1502 during execution thereof by the computer device 1500, the main memory 1504 and the processing device 1502 also constituting computer-readable storage media.

The computer-readable storage medium 1524 may also be used to store an artifact remover 119 (e.g., which may correspond to artifact remover 119 of FIG. 1), which may perform one or more of the operations described above. The computer readable storage medium 1524 may also store a software library containing methods that call artifact remover 119. While the computer-readable storage medium 1524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An intraoral scanning system, comprising:

an intraoral scanner to generate a plurality of intraoral scans of a dental site, the plurality of intraoral scans comprising at least a first intraoral scan and a second intraoral scan; and a computing device operatively connected to the intraoral scanner, wherein the computing device is to:

receive the plurality of intraoral scans of the dental site;

determine a region of the second intraoral scan comprising a plurality of points for which surface normals of the plurality of points are co-directional with a first viewing direction associated with the first intraoral scan, and for which the plurality of points are not behind corresponding points in the first intraoral scan when viewed from the first viewing direction based on a comparison of the second intraoral scan with the first intraoral scan;

identify the region as an artifact based at least in part on determining that the region comprises a threshold number of the plurality of points; and remove the region from the second intraoral scan responsive to identifying the region as an artifact.

2. The intraoral scanning system of claim 1, wherein the computing device is further to identify the region as an artifact based at least in part on:

determining a size of a perimeter of the region;

determining a length of a portion of the perimeter that bounds empty space;

determining a ratio of the length to the size; and determining that the ratio exceeds a ratio threshold.

3. The intraoral scanning system of claim 1, wherein the computing device is further to identify the region as an artifact based at least in part on:

determining that the region bounds moving tissue.

4. The intraoral scanning system of claim 1, wherein a point for which the surface normal at the point is co-directional with the first viewing direction is a back-face point, wherein a point that is not behind a corresponding point in the first intraoral scan when viewed from the first viewing direction is an uncovered point, and wherein the computing device is further to identify the region as an artifact based at least in part on:

determining a number of points in the region that are both back-face points and uncovered points; and determining that the number of points in the region that are both back-face points and uncovered points exceeds a threshold number of points.

5. The intraoral scanning system of claim 1, wherein points in the second intraoral scan that are behind corresponding points in the first intraoral scan from the first viewing direction associated with the first intraoral scan are covered points, and wherein the computing device is further to:

determine, for each point in the second intraoral scan, whether the point is an uncovered point that is proximate to a covered point, wherein uncovered points that are proximate to covered points are identified as proximity area points, wherein the region comprises one or more proximity area points.

6. The intraoral scanning system of claim 5, wherein the computing device is further to:

compute a surface normal for each proximity area point;

determine proximity area points having a surface normal that is orthogonal to the first viewing direction; and identify proximity area points having a surface normal that is orthogonal to the first viewing direction as orthogonal proximity area points, wherein the orthogonal proximity area points are excluded from the region.

7. The intraoral scanning system of claim 1, wherein the first intraoral scan is associated with a first scan capture direction, and wherein the computing device is further to:

determine a first scan direction for the first intraoral scan, wherein the first scan direction represents the first viewing direction for the comparison between the first intraoral scan and the second intraoral scan;

determine whether a first difference between the first scan direction and the first scan capture direction exceeds a difference threshold; and rasterize the first intraoral scan along the first scan direction responsive to determining that the first difference exceeds the difference threshold.

8. The intraoral scanning system of claim 7, wherein the first intraoral scan comprises a first height map, wherein the first scan direction is represented by a first vector, and wherein rasterizing the first intraoral scan along the first scan direction comprises:

converting the first height map into a three-dimensional surface; and projecting the three-dimensional surface onto a plane, wherein the first vector is normal to the plane.

9. The intraoral scanning system of claim 1, wherein the computing device is further to:

determine a first scan direction for the first intraoral scan, wherein the first scan direction represents the first viewing direction for the comparison of the second intraoral scan to the first intraoral scan.

10. The intraoral scanning system of claim 9, wherein determining the first scan direction comprises:

determining a first plurality of surface normals for a first surface of the first intraoral scan, wherein each of the first plurality of surface normals is associated with a respective point on the first surface;

determining a first average of the first plurality of surface normals; and determining a first vector based on the first average, wherein the first vector represents the first scan direction.

11. The intraoral scanning system of claim 1, wherein the first intraoral scan comprises a first height map, and wherein the computing device is further to:

perform image in-painting on the first height map.

12. The intraoral scanning system of claim 1, wherein the first intraoral scan has a first boundary and the second intraoral scan has a second boundary, and wherein the computing device is further to:

determine an additional region of the second boundary that does not overlap with the first boundary; and identify points in the second intraoral scan that are within the additional region as out-of-bounds points, wherein the region does not include the out-of-bounds points.

13. A non-transitory computer readable medium comprising instructions that, when executed by one or more processors, cause the one or more processors to perform operations comprising:

receiving a plurality of intraoral scans of a dental site, the plurality of intraoral scans comprising at least a first intraoral scan and a second intraoral scan;

determining a region of the second intraoral scan comprising a plurality of points for which surface normals of the plurality of points are co-directional with a first viewing direction associated with the first intraoral scan, and for which the plurality of points are not behind corresponding points in the first intraoral scan when viewed from the first viewing direction based on a comparison of the second intraoral scan with the first intraoral scan;

identifying the region as an artifact based at least in part on determining that the region comprises a threshold number of the plurality of points; and removing the region from the second intraoral scan responsive to identifying the region as an artifact.

14. The non-transitory computer readable medium of claim 13, wherein identifying the region as an artifact further comprises:

determining a size of a perimeter of the region;

determining a length of a portion of the perimeter that bounds empty space;

determining a ratio of the length to the size; and determining that the ratio exceeds a ratio threshold.

15. The non-transitory computer readable medium of claim 13, wherein identifying the region as an artifact further comprises:

determining that the region bounds moving tissue.

16. The non-transitory computer readable medium of claim 13, wherein a point for which the surface normal at the point is co-directional with the first viewing direction is a back-face point, wherein a point that is not behind a corresponding point in the first intraoral scan when viewed from the first viewing direction is an uncovered point, and wherein identifying the region as an artifact further comprises:

determining a number of points in the region that are both back-face points and uncovered points; and determining that the number of points in the region that are both back-face points and uncovered points exceeds a threshold number of points.

17. The non-transitory computer readable medium of claim 13, wherein points in the second intraoral scan that are behind corresponding points in the first intraoral scan from the first viewing direction associated with the first intraoral scan are covered points, the operations further comprising:

determining, for each point in the second intraoral scan, whether the point is an uncovered point that is proximate to a covered point, wherein uncovered points that are proximate to covered points are identified as proximity area points, wherein the region comprises one or more proximity area points.

18. The non-transitory computer readable medium of claim 13, the operations further comprising:

determining a first scan direction for the first intraoral scan, wherein the first scan direction represents the first viewing direction for the comparison of the second intraoral scan to the first intraoral scan.

* * * * *